United States Patent
Sutardja et al.

(10) Patent No.: US 7,522,039 B2
(45) Date of Patent: *Apr. 21, 2009

(54) APPARATUS, METHOD, AND COMPUTER PROGRAM FOR AN ALARM SYSTEM

(75) Inventors: Sehat Sutardja, Los Altos, CA (US); Hedley Rainnie, Santa Clara, CA (US); Eric Janofsky, Sunnyvale, CA (US)

(73) Assignee: Marvel International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 11/981,729

(22) Filed: Oct. 31, 2007

(65) Prior Publication Data

US 2008/0088431 A1 Apr. 17, 2008

Related U.S. Application Data

(63) Continuation of application No. 10/703,034, filed on Nov. 5, 2003, now Pat. No. 7,298,252, which is a continuation-in-part of application No. 10/184,505, filed on Jun. 26, 2002, which is a continuation-in-part of application No. 10/184,302, filed on Jun. 26, 2002, which is a continuation-in-part of application No. 10/184,299, filed on Jun. 26, 2002, now Pat. No. 7,315, 764, which is a continuation-in-part of application No. 09/659,693, filed on Sep. 11, 2000.

(60) Provisional application No. 60/211,874, filed on Jun. 14, 2000.

(51) Int. Cl.
G08B 1/08 (2006.01)
G05B 19/18 (2006.01)
G05B 15/02 (2006.01)
G05B 11/01 (2006.01)
G05B 15/00 (2006.01)

(52) U.S. Cl. ............................ 340/539.1; 340/539.17; 340/539.22; 340/539.26; 700/3; 700/9; 700/20; 700/84

(58) Field of Classification Search ............ 340/539.1, 340/539.17, 539.19, 539.22, 539.25, 539.26, 340/539.27, 539.28; 700/1–27, 80, 84, 299, 700/300
See application file for complete search history.

(56) References Cited

U.S. PATENT DOCUMENTS 3,878,514 A 4/1975 Faber
3,925,763 A * 12/1975 Wadhwani et al. ..... 340/825.36

(Continued)

FOREIGN PATENT DOCUMENTS

EP 0 982 732 A1 3/2000

OTHER PUBLICATIONS

IEEE P802.11i/D10.0, Apr. 2004 (Amendment to ANSI/IEEE Std 802.11-1999 (2003 Reaff) edition as amended by IEEE Std 802.11g-2003 and IEEE Std 802.11h-2003); IEEE Standard for Information technology—Telecommunications and information exchange between systems—Local and metropolitan area networks—Specific requirements; Part 11: Wireless Medium Access Control (MAC) and Physical Layer (PHY) specifications: Amendment 6: Medium Access Control (MAC) Security Enhancements; LAN/MAN Committee of the IEEE Computer Society; 184 pages.

(Continued)

Primary Examiner—Daniel Wu
Assistant Examiner—Son M Tang

(57) ABSTRACT

An alarm monitor includes memory that stores an actuator schedule. An input circuit receives a sensor signal that indicates an alarm condition, the sensor signal originating from a sensor that is remote from the alarm monitor. A processor generates digital data based on the sensor signal and generates a first control signal to control an actuator based on the actuator schedule. An interface wirelessly transmits a report signal to a remote master unit based on the digital data and transmits the first control signal to the actuator.

53 Claims, 27 Drawing Sheets

U.S. PATENT DOCUMENTS

| | | | |
|---|---|---|---|
| 4,215,408 A | 7/1980 | Games et al. | 700/278 |
| 4,755,792 A * | 7/1988 | Pezzolo et al. | 340/538 |
| 4,760,647 A | 8/1988 | Gillis | 33/780 |
| 4,821,027 A * | 4/1989 | Mallory et al. | 340/521 |
| 4,897,630 A | 1/1990 | Nykerk | |
| 5,038,268 A | 8/1991 | Krause et al. | 700/16 |
| 5,083,122 A | 1/1992 | Clark | |
| 5,148,546 A | 9/1992 | Blodgett | |
| 5,479,151 A | 12/1995 | Lavelle et al. | |
| 5,511,000 A | 4/1996 | Kaloi et al. | |
| 5,552,766 A | 9/1996 | Lee et al. | |
| 5,682,142 A | 10/1997 | Loosmore et al. | |
| 5,686,885 A * | 11/1997 | Bergman | 340/514 |
| 5,687,325 A | 11/1997 | Chang | |
| 5,724,475 A | 3/1998 | Kirsten | |
| 5,727,231 A | 3/1998 | Bartley et al. | |
| 5,771,174 A * | 6/1998 | Spinner et al. | 700/129 |
| 5,818,389 A | 10/1998 | Lazar | |
| 5,825,202 A | 10/1998 | Tavana et al. | |
| 5,880,775 A | 3/1999 | Ross | |
| 5,903,871 A | 5/1999 | Terui et al. | |
| 5,917,405 A | 6/1999 | Joao | |
| 6,011,666 A | 1/2000 | Wakamatsu | |
| 6,061,306 A | 5/2000 | Buchheim | |
| 6,111,580 A | 8/2000 | Kazama et al. | |
| 6,118,269 A | 9/2000 | Davis | |
| 6,119,091 A | 9/2000 | Huang et al. | |
| 6,181,994 B1 | 1/2001 | Colson et al. | |
| 6,208,263 B1 * | 3/2001 | Strand | 700/9 |
| 6,225,901 B1 * | 5/2001 | Kail, IV | 340/539.11 |
| 6,233,393 B1 | 5/2001 | Yanagihara et al. | |
| 6,271,752 B1 | 8/2001 | Vaios | |
| 6,281,790 B1 | 8/2001 | Kimmel et al. | |
| 6,289,099 B1 | 9/2001 | Edgar, III | |
| 6,292,108 B1 | 9/2001 | Straser et al. | |
| 6,308,253 B1 | 10/2001 | Gadre et al. | |
| 6,332,175 B1 | 12/2001 | Birrell et al. | |
| 6,334,025 B1 | 12/2001 | Yamagami | |
| 6,370,448 B1 * | 4/2002 | Eryurek | 700/282 |
| 6,389,423 B1 | 5/2002 | Sakakura | |
| 6,441,731 B1 | 8/2002 | Hess | |
| 6,476,858 B1 | 11/2002 | Ramirez Diaz et al. | |
| 6,496,692 B1 | 12/2002 | Shanahan | |
| 6,516,039 B1 | 2/2003 | Taura et al. | |
| 6,553,404 B2 | 4/2003 | Stern | |
| 6,585,168 B1 | 7/2003 | Caprio | 236/44 |
| 6,594,272 B1 | 7/2003 | Ketcham et al. | 370/428 |
| 6,603,808 B1 | 8/2003 | Anne et al. | |
| 6,618,812 B2 | 9/2003 | Seiler et al. | |
| 6,624,750 B1 | 9/2003 | Marman et al. | |
| 6,671,343 B1 | 12/2003 | Ito | |
| 6,697,103 B1 | 2/2004 | Fernandez et al. | |
| 6,727,811 B1 | 4/2004 | Fendis | |
| 6,763,182 B1 | 7/2004 | Endo et al. | |
| 6,772,212 B1 | 8/2004 | Lau et al. | |
| 6,859,831 B1 | 2/2005 | Gelvin et al. | |
| 6,867,683 B2 | 3/2005 | Calvesio et al. | |
| 6,950,946 B1 | 9/2005 | Droz et al. | |
| 6,970,081 B1 | 11/2005 | Cheng | |
| 6,975,220 B1 | 12/2005 | Foodman et al. | |
| 7,171,281 B2 * | 1/2007 | Weber et al. | 700/96 |
| 7,242,294 B2 * | 7/2007 | Warrior et al. | 340/539.22 |
| 2002/0002425 A1 * | 1/2002 | Dossey et al. | 700/284 |
| 2002/0019925 A1 | 2/2002 | Dewhurst et al. | |
| 2002/0167590 A1 | 11/2002 | Naidoo et al. | |
| 2005/0125083 A1 | 6/2005 | Kiko | 700/19 |
| 2005/0128068 A1 | 6/2005 | Winick et al. | |
| 2006/0181425 A1 * | 8/2006 | Crane et al. | 340/612 |

FOREIGN PATENT DOCUMENTS

| | | |
|---|---|---|
| EP | 0 999 549 A2 | 5/2000 |
| WO | WO 99/48296 A1 | 9/1999 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

IEEE Std 802.11a-1999 (Supplement to IEEE Std 802.11-1999) [Adopted by ISO/IEC and redesignated as ISO/IEC 8802-11: 1999/ Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11b-1999/Cor 1-2001 (Corrigendum to IEEE Std 802.11-1999); IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 2: Higher-Speed Physical Layer (PHY) extension in the 2.4 GHz Band— Corrigendum 1; LAN/MAN Standards Committee of the IEEE Computer Society; Nov. 7, 2001; 24 pages.

IEEE P802.11g/D8.2, Apr. 2003 (Supplement to ANSI/IEEE Std 802.11-1999(Reaff 2003));Draft Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/ MAN Standards Committee of the IEEE Computer Society; 69 pages.

IEEE Std 802.11h-2003 (Amendment to IEEE Std 802.11, 1999 Edition (Reaff 2003)); as amended by IEEE Stds 802.11a-1999, 802.11b-1999, 802.11b-1999/Cor 1-2001, 802.11d-2001, and 802. 11g-2003; IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 74 pages.

Settles, Curtis; DSP-Augmented CPU cores Promise Performance Boost for Ultra-Compact Drives, Data Storage, May 2000, pp. 35-38, PennWell, US.

Quantum, Part 2: A Closer Look at Hard Disk Drives; Chapter 3: Inside Hard Disk Drives, Quantum Online, Jun. 7, 2000, pp. 1-3, Quantum, US.

Quantum, Chapter 4: Recent Technological Developments: The Impact of Leading-Edge Technology on Mass Storage, Quantum Online, Jun. 7, 2000, pp. 1-3, Quantum, US.

Atmel Announces 802.11b Media Access Controller (MAS) with Integrated Baseband for Wireless Applications, Design & Reuse, Aug. 21, 2002.

* cited by examiner

APPARATUS, METHOD, AND COMPUTER PROGRAM FOR AN ALARM SYSTEM

CROSS-REFERENCE TO RELATED APPLICATIONS

This application is a Continuation of U.S. patent application Ser. No. 10/703,034, filed Nov. 5, 2003, now U.S. Pat. No. 7,298,252, which application is a continuation-in-part of U.S. Non-Provisional patent application Ser. No. 09/659,693 entitled "Apparatus And Method For Recording And Reproducing Digital Data," filed Sep. 11, 2000, which claims the benefit of U.S. Provisional Application Ser. No. 60/211,874, entitled "Method and Apparatus For Recording And Reproducing Digital Data," filed Jun. 14, 2000, the disclosures thereof incorporated by reference herein in its entirety.

This application is a continuation-in-part of U.S. Non-Provisional patent application Ser. No. 10/184,505 entitled "Apparatus And Method For Recording And Reproducing Digital Data," filed Jun. 26, 2002, the disclosure thereof incorporated by reference herein in its entirety.

This application is a continuation-in-part of U.S. Non-Provisional patent application Ser. No. 10/184,302 entitled "Apparatus And Method For Recording And Reproducing Digital Data," filed Jun. 26, 2002, the disclosure thereof incorporated by reference herein in its entirety.

This application is a continuation-in-part of U.S. Non-Provisional patent application Ser. No. 10/184,299 entitled "Apparatus And Method For Recording And Reproducing Digital Data," filed Jun. 26, 2002 now U.S. Pat. No. 7,315,764, the disclosure thereof incorporated by reference herein in its entirety.

BACKGROUND

The present invention relates generally to alarm systems.

FIG. 1 is an example of a conventional MP3 player. MP3 player includes an interface 106, nonvolatile solid state memory 102, a decoder 110, a digital-to-analog (D/A) converter 147, an audio output 116, a key pad 108, a display 112, a controller 104, RAM 144 and ROM 145.

Controller 104 controls the operation of the MP3 player in accordance with a set of programmed instructions. Programmed instructions for controller 104 are stored in nonvolatile memory or ROM 145, and RAM 144 is provided as the working memory for controller 104

Typically, MP3 data, which is a digital compressed format representing music data, is initially stored on a personal computer 50 and is subsequently transferred to the MP3 player via interface 106, under control of controller 104. The MP3 data is stored in nonvolatile solid state memory 102. Interface 50 can implemented by a standard parallel port, serial port, USB and the like. Nonvolatile solid state memory 102 may be implemented as flash memory. Generally, for a music quality recording, a nonvolatile solid state memory having 64 Mbytes can store about 1 hour of music. Flash memory provides the capability of retaining the stored digital data even when the MP3 player is powered down. Once the digital data has been transferred to the MP3 player, it no longer needs to be connected to personal computer 50, and the MP3 player can play back the MP3 data autonomously from personal computer 50.

Decoder 110 functions to decode and decompress the MP3 data file stored in nonvolatile solid state memory 102. Decoder 110 decompresses the MP3 music file in accordance controller 104 according to the MP3 format, and decodes the decompressed music file into a bit stream form. The bit stream is then converted into analog form by digital to analog converter 147 for connection to a speaker, earphone and the like.

A decoding program for the MP3 decoder function is stored in the ROM 145 and loaded to RAM 144 by controller 104 as required.

The MP3 player comprises a keypad 108 for allowing user control and interaction with the MP3 player. Such control may include power on/power off, music selection and volume. The MP3 also comprises a display 112 for displaying characters or graphics, such as a battery indicator, a play mode indicator, a volume indicator, available memory size and the title of the music being played.

SUMMARY

In general, in one aspect, the invention features a method, apparatus, and computer program for an alarm system. It comprises a master unit; and an alarm monitor comprising an alarm sensor to provide a sensor signal representing alarm conditions; a processor to produce digital data based on the alarm signal; and a media access controller to generate a report signal comprising the digital data; and a transmitter to transmit the report signal to the master unit.

Particular implementations can include one or more of the following features. The processor is further to cause the transmitter to transmit the report signal when the sensor signal meets a predetermined condition. The alarm sensor comprises a camera; and the sensor signal comprises an image captured by the camera. The media access controller is further to generate a packet comprising the digital data; and the transmitter is further to transmit the packet. The media access controller is further to generate an electronic mail message comprising the digital data; and the transmitter is further to transmit the electronic mail message. The alarm monitor further comprises a receiver to receive a further signal comprising a destination address; wherein the media access controller directs the electronic mail message to the destination address. The processor is further to enter a sleep mode when the sensor signal meets a predetermined condition for a predetermined interval; and, when the sensor signal no longer meets the predetermined condition, the processor is further to leave the sleep mode and to cause the transmitter to transmit the report signal. The alarm sensor comprises at least one of the group comprising a seismometer; a barometer; a thermometer; a motion detector; a smoke detector; a carbon monoxide detector; and a glass breakage detector. Implementations comprise a receiver to receive a further signal representing sensor calibration information from the master unit; wherein the media access controller is further to obtain the sensor calibration information from the further signal; and wherein the processor is further to calibrate the alarm sensor in accordance with the sensor calibration information. The alarm system complies with a standard selected from the group consisting of IEEE 802.11; IEEE 802.11a; IEEE 802.11b; IEEE 802.11g; IEEE 802.11h; and IEEE 802.11i. The processor and the media access controller are implemented together as a single integrated circuit. The alarm sensor, the processor and the media access controller are implemented together as a single integrated circuit.

In general, in one aspect, the invention features a method, apparatus, and computer program for an alarm system. It comprises receiving a signal representing digital data; obtaining the digital data from the signal representing the digital data; and producing a control signal based on the digital data; and providing the control signal to an actuator to manipulate a physical portal in response to the control signal.

Particular implementations can include one or more of the following features. It comprises manipulating the physical portal in response to the control signal. Manipulating the physical portal is selected from the group consisting of opening the physical portal; closing the physical portal; locking the physical portal; and obscuring the physical portal. The physical portal is selected from the group consisting of a window; and a door. It comprises receiving a sensor signal provided by one or more sensors; and providing the control signal based on the digital data and the sensor signal. The one or more sensors comprise at least one of the group comprising a thermometer; a light detector; a moisture detector; a wind detector; a barometer; a motion detector; a smoke detector; a gas detector; and a glass breakage detector. It comprises providing a keypad control signal in response to operation of a keypad; and providing the control signal based on the digital data and the keypad control signal. It comprises displaying a status of the apparatus. It comprises transmitting a report signal representing a status of the apparatus. It comprises storing an actuator schedule; and producing the control signal based on the actuator schedule. It comprises producing the control signal based on the actuator schedule when the signal representing the digital data is unavailable.

In general, in one aspect, the invention features a physical portal comprising a processor to produce digital data based on a sensor signal provided by a sensor; a media access controller to generate a report signal comprising the digital data; and a transmitter to transmit the report signal.

Particular implementations can include one or more of the following features. The physical portal is selected from the group consisting of a window; and a door. The processor is further to cause the transmitter to transmit the report signal when the sensor signal meets a predetermined condition. The sensor comprises a camera; and wherein the sensor signal comprises an image captured by the camera. The media access controller is further to generate a packet comprising the digital data; and wherein the transmitter is further to transmit the packet. The media access controller is further to generate an electronic mail message comprising the digital data; and wherein the transmitter is further to transmit the electronic mail message. The physical portal further comprises a receiver to receive a further signal comprising a destination address; wherein the media access controller directs the electronic mail message to the destination address. The processor is further to enter a sleep mode when the sensor signal meets a predetermined condition for a predetermined interval; and wherein, when the sensor signal no longer meets the predetermined condition, the processor is further to leave the sleep mode and to cause the transmitter to transmit the report signal. The physical portal further comprises the sensor. The sensor comprises at least one of the group comprising a thermometer; a light detector; a moisture detector; a wind detector; a barometer; a motion detector; a smoke detector; a gas detector; and a glass breakage detector. The sensor, the processor and the media access controller are implemented together as a single integrated circuit. The physical portal further comprises a receiver to receive a further signal representing sensor calibration information; wherein the media access controller is further to obtain the sensor calibration information from the further signal; and wherein the processor is further to calibrate the sensor in accordance with the sensor calibration information. The transmitter complies with a standard selected from the group consisting of IEEE 802.11; IEEE 802.11a; IEEE 802.11b; IEEE 802.11g; IEEE 802.11h; and IEEE 802.11i. The processor and the media access controller are implemented together as a single integrated circuit. The physical portal further comprises a receiver to receive a signal representing digital data; wherein the media access controller is further to obtain the digital data from the signal representing the digital data; wherein the processor is further to produce a control signal based on the digital data obtained by the media access controller; and an output circuit to provide the control signal to an actuator to manipulate the physical portal in response to the control signal. The physical portal further comprises the actuator. The actuator is selected from the group consisting of a device to open the physical portal; a device to close the physical portal; a device to lock the physical portal; and a device to obscure the physical portal. The processor is further to provide the control signal based on the digital data obtained by the media access controller and the sensor signal. The physical portal further comprises a keypad to provide a keypad control signal in response to operation of the keypad; wherein the processor is further to provide the control signal based on the digital data obtained by the media access controller and the keypad control signal. The physical portal further comprises a display to display a status of the physical portal. The receiver is a wireless receiver. The receiver complies with a standard selected from the group consisting of IEEE 802.11; IEEE 802.11a; IEEE 802.11b; IEEE 802.11g; IEEE 802.11h; and IEEE 802.11i. The physical portal further comprises a memory to store an actuator schedule; and wherein the processor is further to produce the control signal based on the actuator schedule. The processor is further to produce the control signal based on the actuator schedule stored in the memory when the signal representing the digital data is unavailable. The memory is non-volatile.

The details of one or more implementations are set forth in the accompanying drawings and the description below. Other features will be apparent from the description and drawings, and from the claims.

DESCRIPTION OF DRAWINGS

The leading digit(s) of each reference numeral used in this specification indicates the number of the drawing in which the reference numeral first appears. Like reference numerals refer to like parts.

DETAILED DESCRIPTION

Embodiments of the present invention are directed to an alarm system that transmits digital data representing alarm conditions such as weather conditions, motion, gas content, sounds, and so on. The digital data can be encoded, compressed or both, and can be transmitted wirelessly or by wire, cable, or the like.

Figure 1:
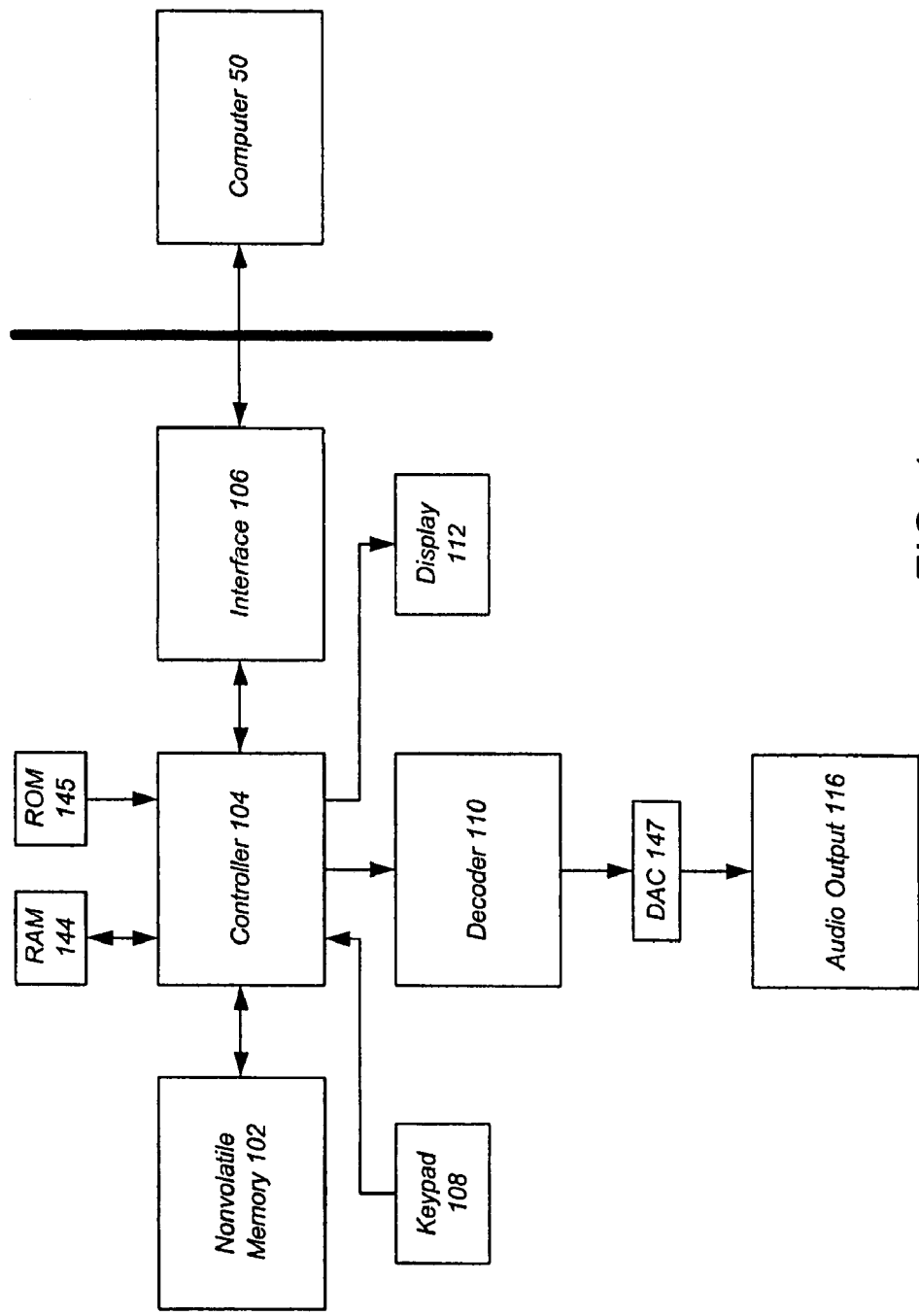
FIG. 1 is a block diagram of a conventional MP3 player.
Figure 2:
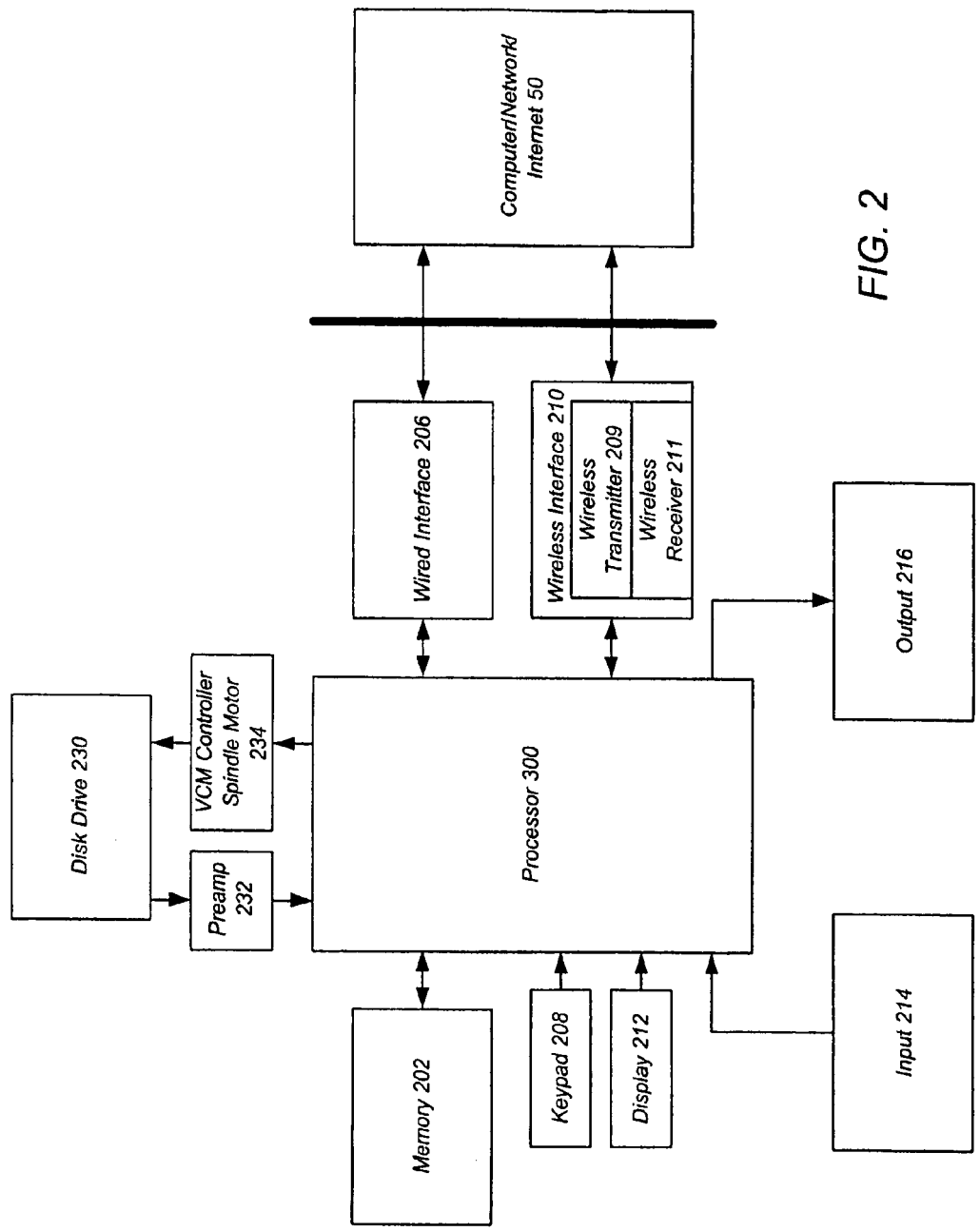
FIG. 2 is a block diagram of a first embodiment of a media player/recorder in accordance with the present invention.

Referring to FIG. 2 there is shown the first embodiment of media player/recorder of the present invention. The media player/recorder includes a wired interface 206, a wireless interface 210, memory 202, a processor 300, an output 216, a keypad 208, a display 212, a storage device (the storage device may utilize, for example, a magnetic media (such as a hard disk drive), magneto-optical media, an optical media (such as a CD ROM, CDR, CDRW or the like), and the like) such as, a disk drive 230, a preamp 232 and a voice coil motor (VCM) 234. Wireless interface 210 includes a wireless transmitter 209 and a wireless receiver 211.

The operation of the media player/recorder is as follows. Operation of the media player/recorder is controlled by the user through keypad 208. Status of the media player/recorder is provided to the user by display 212.

Media data, which was previously digitized, may be obtained (downloaded) from a personal computer, network appliance, local area network, Internet 50 and the like, including wireless networks with infrastructure, such as a designated access point, peer-to-peer wireless networks, and the like. Such external devices communicate with the media player/recorder via wired interface 206 and wireless interface 210, which are controlled by processor 300. Wired interface 206 may be implemented, for example, as a parallel interface, serial interface, USB, Ethernet connection, IEEE 1394 (a.k.a. Firewire), and the like. Wireless interface 210 may be implemented, for example, as an infrared interface, IEEE 802.15, IEEE 802.11, Bluetooth™ and the like. Again the present invention is independent of the interface selected. Media data is then stored on the storage device such as, disk drive 230 in accordance with processor 300. Disk drive 230 is preferably a miniature drive with a capacity of 1 Gbyte of data storage, which is particularly suitable for a portable device. Of course, any other appropriate sized disk drive may be employed.

Alternatively, media data may be obtained directly from an external analog source, such as a microphone or video camera, connected to input 214. Input 214 takes the input signal from external device and sets the analog signal to an appropriate level. The analog signal is then converted to a digital signal and compressed using a selected format by processor 300, as will be described herein below. The compressed digital data is similarly stored on disk drive 230.

When the user chooses a selection of media data to be played back with keypad 208, processor 300 powers up disk drive 230 and retrieves the selected data which is then transferred to memory 202. It is noted that the powering up of the device is done in a sequential manner so as to minimize energy consumption of the device. A more detailed description is provided below.

Memory 202 comprises a solid state memory, such as, for example dynamic random access memory (solid state memory), flash memory, EEPROM, or the like. It is not necessary for memory 202 to be nonvolatile since the media data is stored in a nonvolatile manner on storage device or disk drive 230. The quantity of solid state memory required is less than is required in a conventional MP3 player. The quantity of solid state memory contemplate is about 2 Mbytes, which is sufficient to store about 2 minutes of MP3 data. Of course, as will be appreciated by one of ordinary skill in the art, when dealing with video data, more solid state memory may be required. The amount of solid state memory supplied is selected to minimize energy consumption.

After the selected data is stored in memory 202, disk drive 230 is then powered down. In this manner, during playback disk drive 230 is powered up only during the transfer of the selected media data from disk drive 230 to memory 202, which results in lower energy consumption. A more detailed description of the powering down of disk drive 230 is provided herein below. The media data is retrieved from memory 202. Processor 300 determines the format of data compression from the retrieved data. Disk drive 230, also stores the data compression/decompression algorithms. The data is decompressed in accordance with the determined format and converted to an analog signal by processor 300. The analog signal is set to an appropriate level by output circuit 216. If the analog signal contains audio data, output circuit 216 is connected to a speaker, headphone and the like for playback, and if the analog signal contains video data, output circuit 216 is connected to a display device for playback.

Additionally, media data recorded on disk drive 230 or stored in memory 202 may be transferred (uploaded) to a personal computer, network appliance, local area network, internet 50 or another media player/recorder through interfaces 206 and 210 under the control of processor 300.

Figure 3:
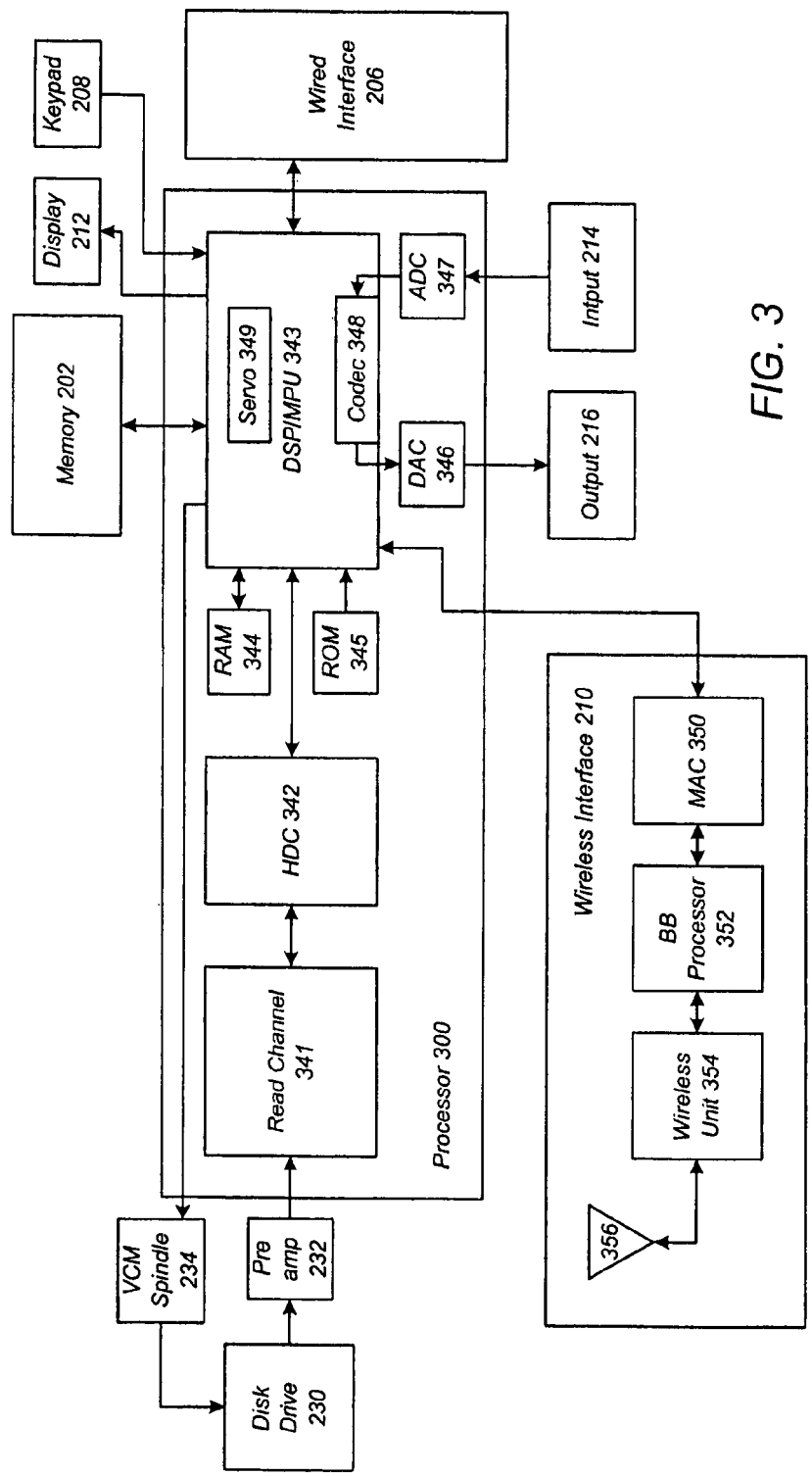
FIG. 3 is a more detailed block diagram of a first embodiment of the media player/recorder of FIG. 2.

FIG. 3 is a detailed block diagram of processor 300. Processor 300 is preferably implemented as a single integrated circuit. A media playback/recorder apparatus having a processor implemented as a single integrated circuit can be fabricated at lower cost and have lower energy consumption. Alternatively, processor 300 may be implemented by discrete components. Processor 300 comprises a read channel 341, storage controller or hard disk controller 342, digital signal processor/microprocessor unit (DSP/MPU) 343, random access memory (RAM) 344, a non volatile memory such as read only memory (ROM) 345, digital to analog converter (DAC) 346 and analog to digital converter (ADC) 347. DSP/MPU 343 comprises servo controller 349 and Codec 348. In a preferred embodiment, DSP/MPU 343 is implemented as a single integrated circuit. In another embodiment, MPU may be implemented as one integrated circuit and the DSP may be implemented as another integrated circuit.

It is noted that DSP/MPU 343 may comprise a microprocessor unit, a digital signal processor, or any combination thereof. ROM 345 stores programmed instructions for processor 300 and DSP/MPU 343 to control the operation of both the disk drive 230 (and associated circuitry) and the signal processing of the media data. RAM 345 is provided as a working memory for DSP/MPU 343. For each of the various compression formats discussed above, the decompression and compression algorithms for Codec 348 are stored on disk drive 230. Storing the decompression and compression algorithms on disk drive 230 minimizes the size of ROM 345 and its energy consumption. Additionally, this feature allows future compression and decompressions formats to be easily implemented for the media player/recorder.

In the implementation of FIG. 3, wireless interface 210 is implemented separately from processor 300, and includes an antenna 356, a wireless unit 354, a baseband processor 352, and a media access controller (MAC) 350. Antenna 356 is a conventional antenna for receiving and transmitting wireless signals. Wireless unit 354 converts wireless signals received by antenna 356 to analog baseband signals, and converts analog baseband signals received from baseband processor 352 to wireless signals for transmission by antenna 356. Baseband processor 352 converts analog baseband signals received from wireless unit 354 to a digital bitstream, and converts a digital bitstream received from MAC 350 to analog baseband signals, both according to well-known methods. MAC 350 frames the digital bitstream produced by baseband processor 352, and filters the frames to select the frames addressed to processor 300, both according to well-known methods. MAC 350 also converts frames received from processor 300 to a digital bitstream for baseband processor 352, also according to well-known methods. In some implementations, MAC 350 includes an embedded microprocessor.

Figure 6:
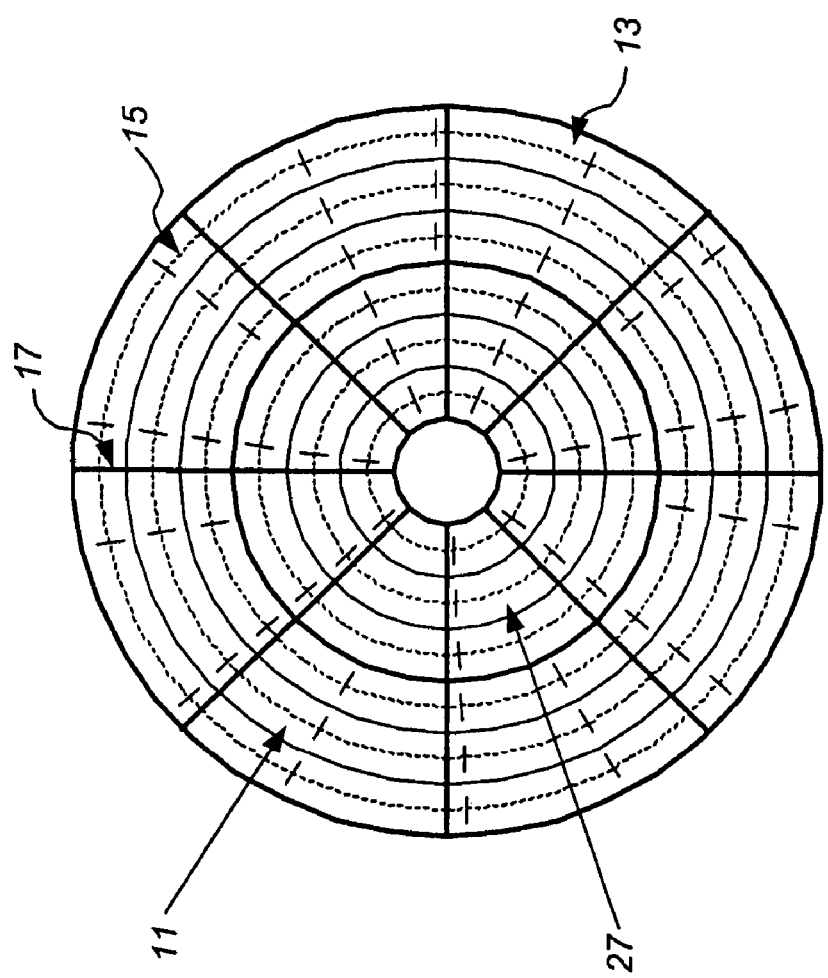
FIG. 6 shows an exemplary data format of a magnetic disk having a plurality of concentric tracks comprised of a plurality of user data sectors and embedded servo data sectors.

Prior to discussing the operation of processor 300, reference is made to FIG. 6. FIG. 6 shows an exemplary data format of a magnetic media used in disk drive 230, comprising a series of concentric data tracks 13 wherein each data track 13 comprises a plurality of sectors 15 with embedded servo wedges 17. Servo controller 349 processes the servo data in servo wedges 17 and, in response thereto, positions the read/write head over a desired track. Additionally, servo controller 349 processes servo bursts within servo wedges 17 to keep a disk head of disk drive 230 aligned over a centerline of the desired track while writing and reading data. Servo wedges 17 may be detected by the discrete time sequence detector implemented in DSP/MPU 343. It is important to note that DSP/MPU 343 is utilized only during the time period for detecting servo wedges 17; during other periods DSP/MPU 343 is available to perform other functions as described below, such as signal processing for media data playback and recording. By using only one DSP rather than two, the cost of fabrication and the amount of energy consumption can be reduced.

As described above, the powering up of the device is done in a sequential manner so as to minimize energy consumption of the device. More specifically, the mechanical or motor portions of the storage device are energized first. After the motor reaches operating speed, VCM 234 is energized, followed by the energization of read channel 341 and HDC 342.

The operation of processor 300 is as follows. DSP/MPU 343 controls the entire operation of the media player/recorder. DSP/MPU 343 is coupled to hard disk controller 342. When writing data to disk drive 230, hard disk controller 342 receives a write instruction and write data from DSP/MPU 343. The write data is temporarily stored in a cache memory (not shown) which is used as a buffer memory. Based on a clock from a clock generator (not shown), DSP/MPU 343 controls voice coil motor (VCM) and spindle motor 234 via servo unit 349. As a result, the magnetic head is moved to a desired track position on the magnetic disk by the head arm, and the magnetic disk is rotated at a rated rotational speed by the spindle, which is driven by spindle motor 234. The data is read from the cache memory and supplied to read channel 341 via hard disk controller 342. Read channel 341 encodes the write data under the control of DSP/MPU 343, and supplies the encoded write data to preamplifier 232. The magnetic head writes the encoded write data on the magnetic disk in accordance with a signal from preamplifier 232.

When reading data from the magnetic disk, hard disk controller 342 receives a read instruction from DSP/MPU 343. Based on a clock signal, DSP/MPU 343 controls voice coil motor and spindle motor 234 via servo unit 349. Hence, the magnetic head is moved to a desired track position on the magnetic disk by the head arm, and the magnetic disk is rotated by spindle motor 234.

The data read from the magnetic disk by the magnetic head is supplied to read channel 341 via preamplifier 232. Read channel 341 decodes the read data under the control of DSP/MPU 343, and generates read data. The read data are supplied from read channel 341 to hard disk controller 342 under the control of DSP/MPU 343, and are temporarily stored in the cache memory. The read data read from the cache memory are supplied to DSP/MPU 343 from hard disk controller 342.

As noted above, operation of the media player/recorder is controlled by the user through keypad 208, which is in communication with DSP/MPU 343. Status of the media player/recorder is provided to the user by display 212 in accordance with DSP/MPU 343. When either uploading or downloading data, the media player/recorder is in communication with personal computer, network appliance, local area network, Internet 50. Otherwise the media player/recorder can be operated independently. The user selects the file to be downloaded from personal computer, network appliance, local area network, Internet 50 by way of keypad 208. Alternatively the user can select the file to be downloaded from the personal computer. DSP/MPU 343 controls the flow of data through interfaces 206 and/or 210 and stores the data onto hard disk 230 in accordance with the method described above. When uploading data to personal computer, network appliance, local area network, Internet 50 the process is reversed.

To record data directly input into media player/recorder from an external analog source, the external device is placed in communication with input 214. Input 214 takes the input signal from the external device and sets the analog signal to an appropriate level. The analog signal is then converted to a digital signal by ADC 347 of processor 300. Codec 348 of DSP/MPU 343 compresses the digitized data using a default compression format or one selected by the user by way of keypad 208. The default or selected compression program is transferred from hard disk 230 to RAM 344 and provided to Codec 348 for encoding. The compressed digital data is similarly stored on disk drive 230 under the control of DSP/MPU 343.

When the user chooses a selection of media data to be played back with keypad 208, DSP/MPU 343 powers up disk drive 230 and retrieves the selected data as described above. The retrieved data is then written to memory 202. After the selected data is stored in memory 202, disk drive 230 is then powered down by DSP/MPU 343. In this manner, during playback disk drive 230 is powered up only during the transfer of the selected media data from disk drive 230 to memory 202, which results in lower energy consumption. A single song stored in MP3 format may take approximately one second to retrieve from disk drive 230. The media data is retrieved from memory 202 by DSP/MPU 343 and the compression format is then determined.

If the decompression program has already been transferred to RAM 344, the program is provided to Codec 348. Otherwise the decompression algorithm is retrieved from hard disk 230 and transferred to RAM 344. The data is then decompressed by Codec 348 and converted to an analog signal by DAC 346. The analog signal is set to an appropriate level by output circuit 216. If the analog signal contains audio data, output circuit 216 is connected to a speaker, headphone and the like for playback, and if the analog signal contains video data, output circuit 216 is connected to a display device for playback.

It is noted that the capacity of disk drive 230 is selected to hold a desired amount of media data, and the amount of solid state memory 202 is selected to minimize energy consumption. A disk drive having a capacity of 1 Gbyte can store approximately 30 hours of MP3 compressed music.

This section will described the power management control of the device by CPU/MPU 343.

Figure 7:
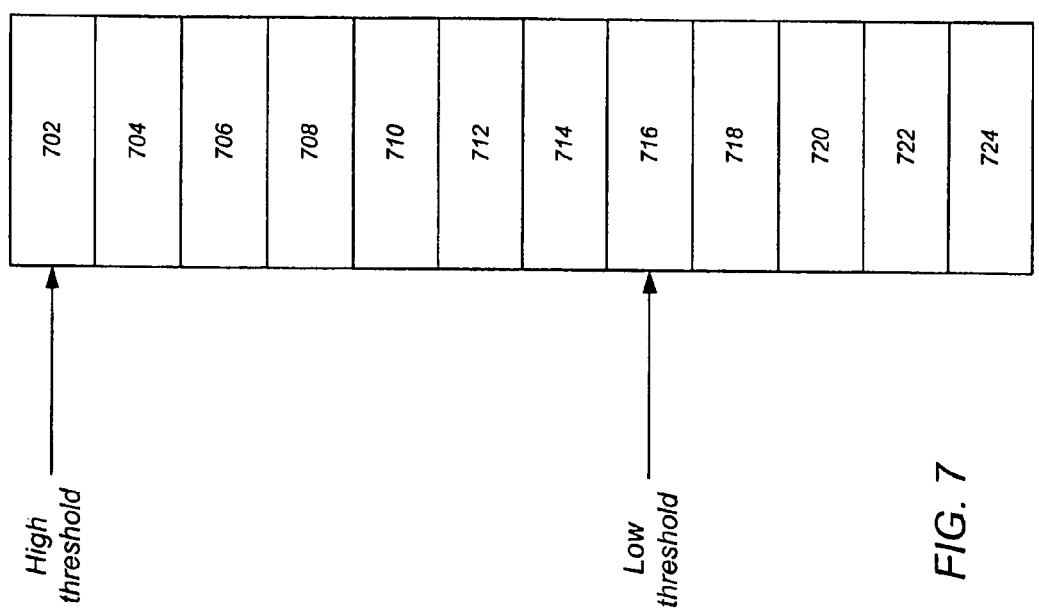
FIG. 7 is a schematic representation of memory 202.
Figure 9:
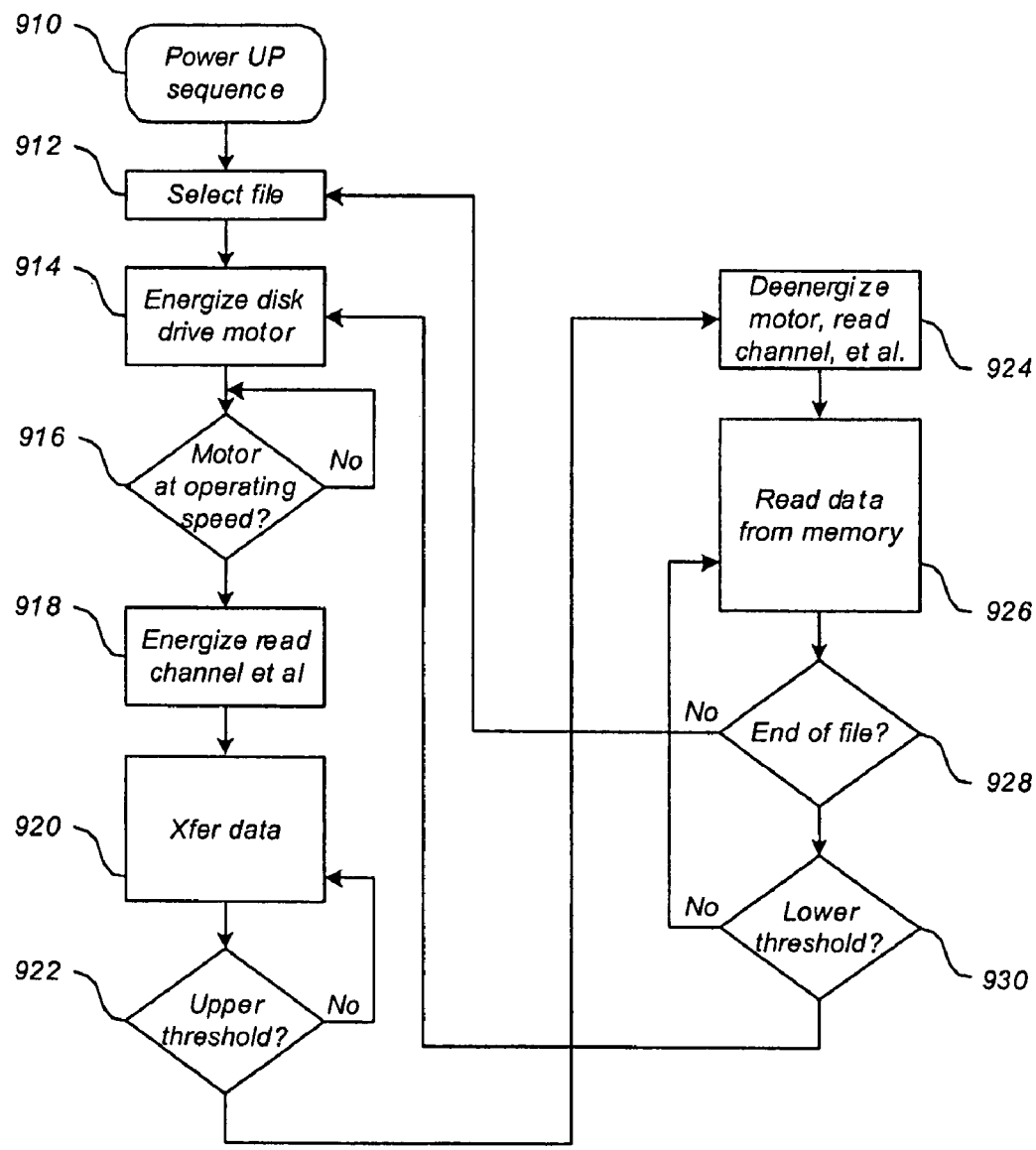
FIG. 9 is flow chart of an energization/deenergization procedure according to a first embodiment of the present invention.

Referring now to FIGS. 3, 7 and 9, when the user turns on the media player and selects a file to be played (step 912), the various components of media player are powered up in a sequential manner so as to minimize energy consumption of the device. More specifically, the mechanical or motor portions of the storage device or disk drive 230 are energized first (step 914). After the motor reaches its operating speed (step 916), VCM 234, preamp 232, read channel 341 and HDC 342 are energized, since these components are only functional after disk drive 230 becomes operational. Energy would be unnecessarily expended if preamp 232, read channel 341 and HDC 342 were energized before disk drive 230 becomes operational. Therefore, VCM 234, preamp 232, read channel 341 and HDC 342 are energized only after disk drive 230 becomes operational (step 918). Preamp 232, read channel 341 and HDC 342 can be referred to as a storage circuit and include circuits to transform data stored on a storage device to a digital signal.

FIG. 7 is a schematic representation of memory 202. User data is first stored from location 724 to location 702 in a sequential manner in memory 202. In one embodiment, DSP/MPU 343 uses a pointer system in connection with memory 202 to determine when the amount of data stored the amount data stored reaches an upper threshold value (step 922). When the amount of data stored in memory 202 reaches the upper threshold value, HDC 342, read channel 341, preamp 232, disk drive 230 and VCM 234 are powered down or deenergized (step 924). Of course, as will be appreciated by one of ordinary skill in the art, while data is being to memory 202, data may also be read contemporaneously therefrom by DSP/MPU 343 for decompression and playback. Data is then read out from memory 202 starting at location 702 towards location 724 by DSP/MPU 343 (step 926). When the data file has been completely read from memory (step 928), the user can select another file. The data is continually read from memory 202, until the amount of data remaining is below a low threshold value (step 930). When the data remaining in memory 202 is below the threshold value, disk drive 230, VCM 234, preamp 232, read channel 341 and HDC 342 are sequentially energized as noted above, and data is transferred from the storage device to memory 202.

Figure 10:
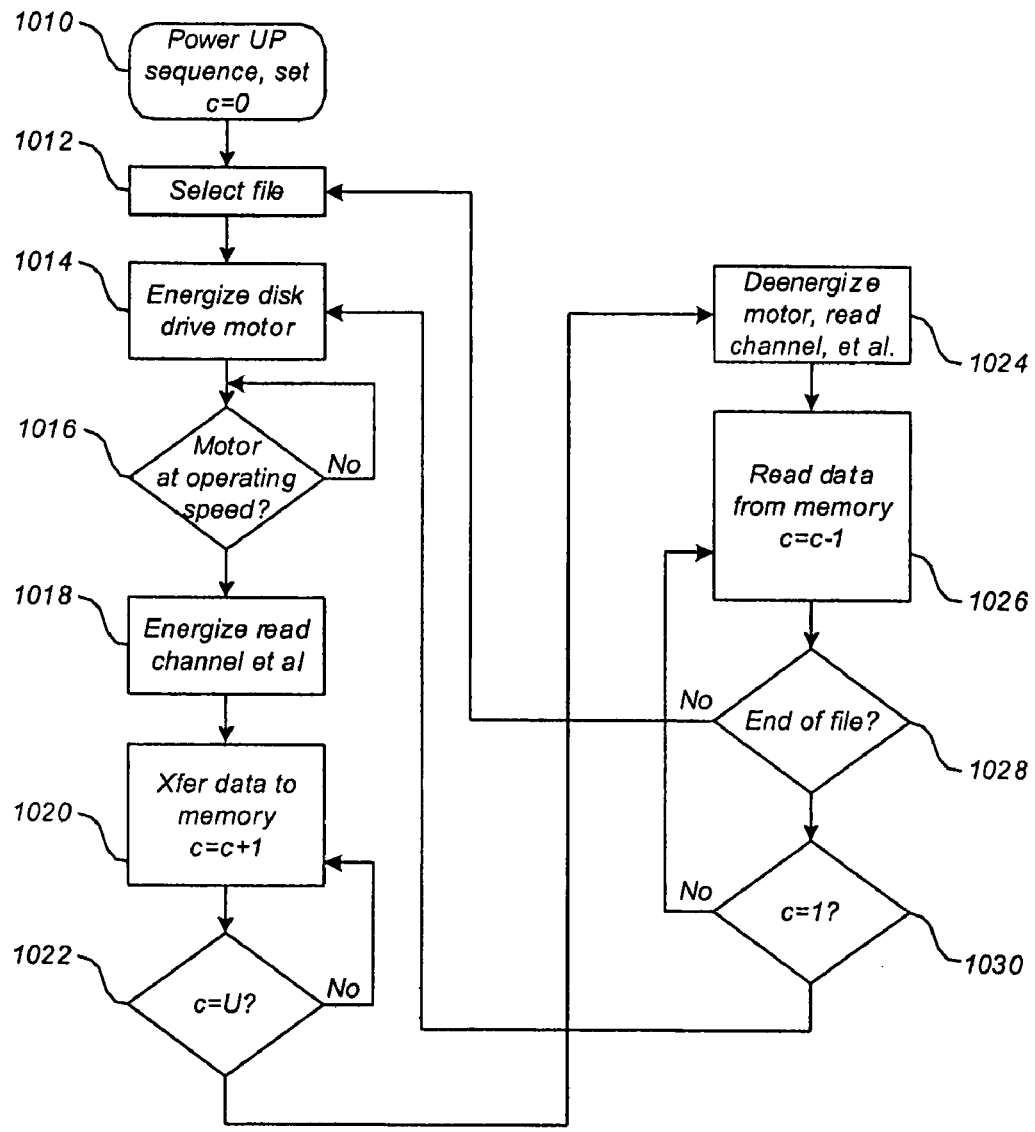
FIG. 10 is flow chart of an energization/deenergization procedure according to a second embodiment of the present invention.

FIG. 10 is an alternate embodiment to FIG. 9. Instead of utilizing a pointer system, the amount of data transferred to memory 202 is counted (step 1020) by a counter incorporated in DSP/MPU 343. The sequential energization of the disk drive 230, VCM 234, preamp 232, read channel 341 and HDC 342 is similar to that of the embodiment of FIG. 9 (steps 1012, 1014, 1016 and 1018). When amount of data transfer to memory 202 is greater than or equal to an upper limit U (step 1022), HDC 342, read channel 341, preamp 232, disk drive 230 and VCM 234 are powered down or deenergized (step 1024). As data is read from memory, the counter decrements the count, and when the count is less than or equal to a lower limit 1 (step 1030), disk drive 230, VCM 234, preamp 232, read channel 341 and HDC 342 are sequentially energized as noted above, and data is transferred from the storage device to memory 202.

Figure 11:
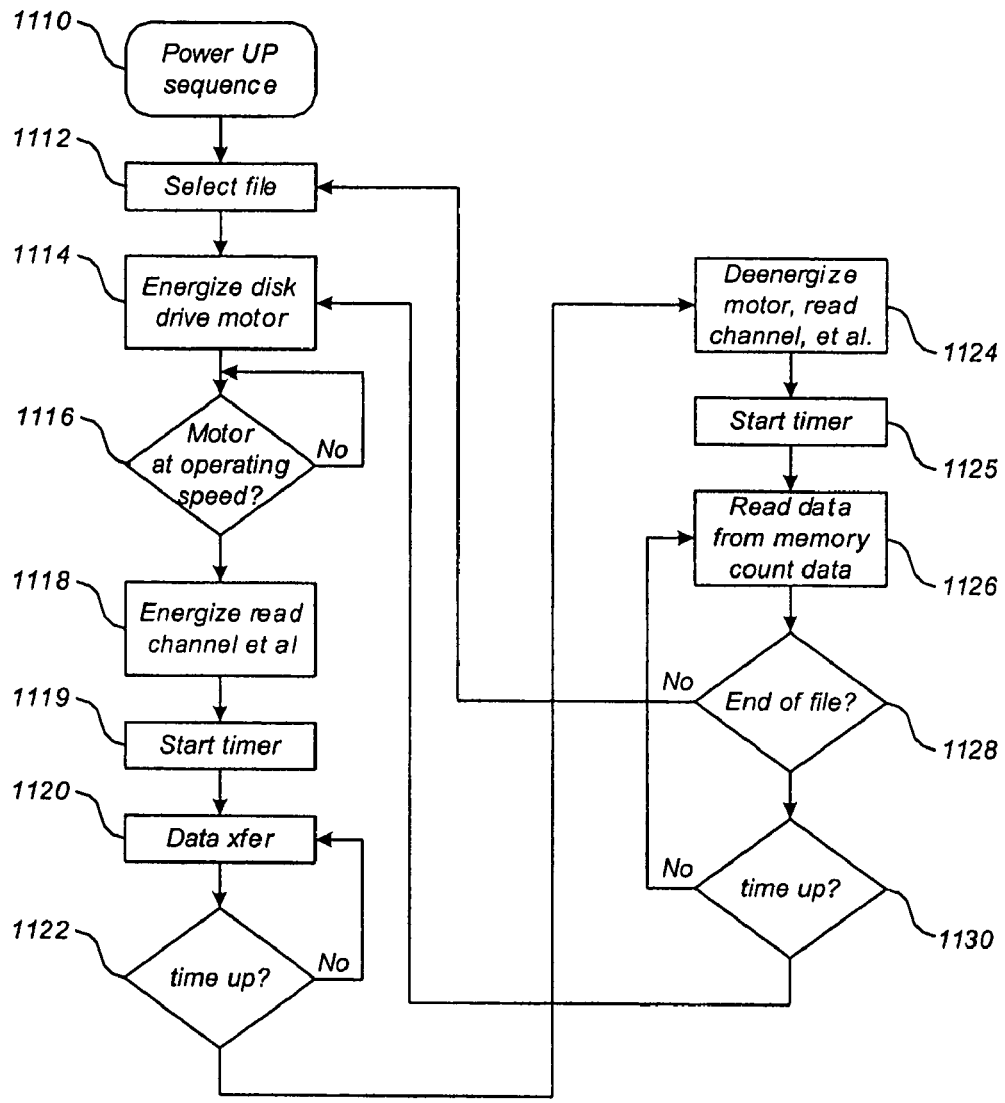
FIG. 11 is flow chart of an energization/deenergization procedure according to a third embodiment of the present invention.

FIG. 11 is another alternate embodiment to FIG. 9. The embodiment in FIG. 9 utilizes a timer incorporated in DSP/MPU 343 to approximate the amount of data transferred to memory 202 in accordance with the data transfer rate of disk drive 230. The sequential energization of disk drive 230, VCM 234, preamp 232, read channel 341 and HDC 342 is similar to that of the embodiment of FIG. 9 (steps 1112, 1114, 1116 and 1118). The timer is started (step 1119) as data is transferred form disk drive 230 to memory 202. When the timer times out, HDC 342, read channel 341, preamp 232, disk drive 230 and VCM 234 are powered down or deenergized (step 1124). As data is read from memory, the timer is started (1125), and when the timer times out (step 1130), disk drive 230, VCM 234, preamp 232, read channel 341 and HDC 342 are sequentially energized as noted above, and data is transferred from the storage device to memory 202.

Figure 8:
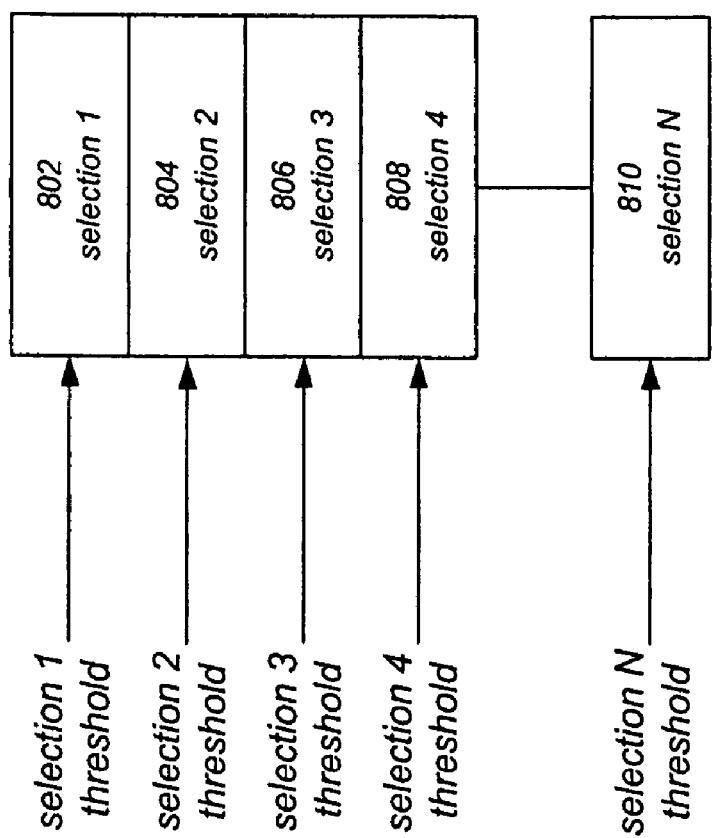
FIG. 8 is a memory map of memory 202.
Figure 12:
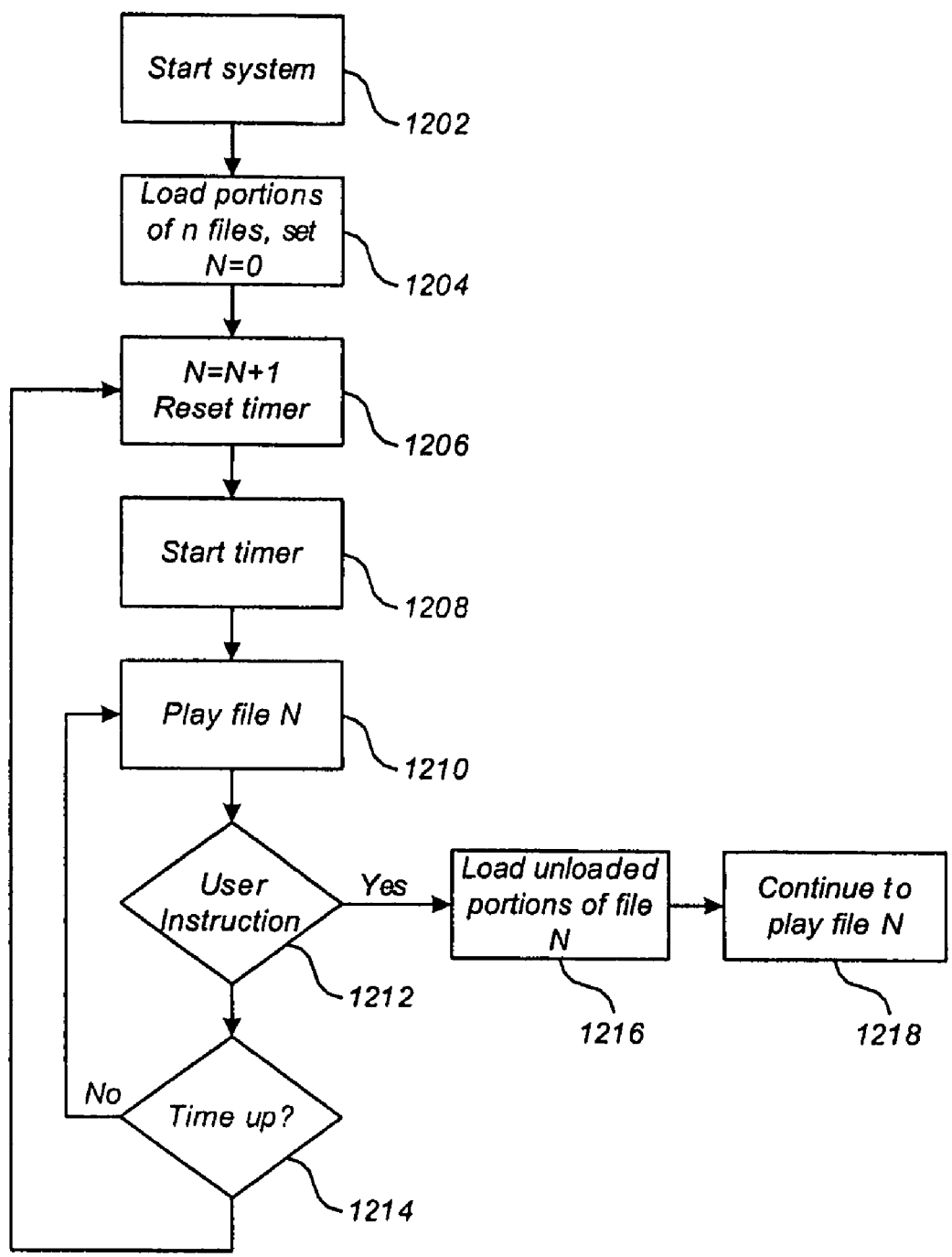
FIG. 12 is flow chart of an operating procedure according to the present invention.

In the simplest implementation, media data representing one selection (such as a single song) is transferred from disk drive 230 to memory 202 for playback. FIG. 8 is a schematic representation of memory 202, and FIG. 12 is a flow chart illustrating an alternate implementation. As shown therein, instead of retrieving just one selection, first portions of multiple selections are transferred from disk drive 230 to memory 202. These multiple selections may include the user's favorite selections, random selections from an external source, or the like (step 1204). When the user starts playing back the selection, a timer is started (step 1208) and the first selection is played back (step 1210). If a user instruction is received (step 1212) to continue playing that selection is received within a predetermined time (step 1214), the remaining portion of the selection is transferred from disk drive 230 to memory 202 (step 1216) for continued play back (step 1218). If the timer times out (step 1214), the first portion of the next selection (step 1206) is played back and the process is repeated for each remaining first portion. Alternatively, instead of using a timer, a memory threshold, as shown in FIG. 8, may be utilized permit playback of the entire current selection if the user instruction is received before the memory being read out goes below the current selection threshold. Otherwise the first portion of the next selection is played back. Of course, the play back of portions of selections 1 through N may be in any order, such as sequential, random and predetermined. If the play back is in sequential order new selections may be transferred from disk drive 230 to memory 202 to replace previously played back selections.

Figure 4:
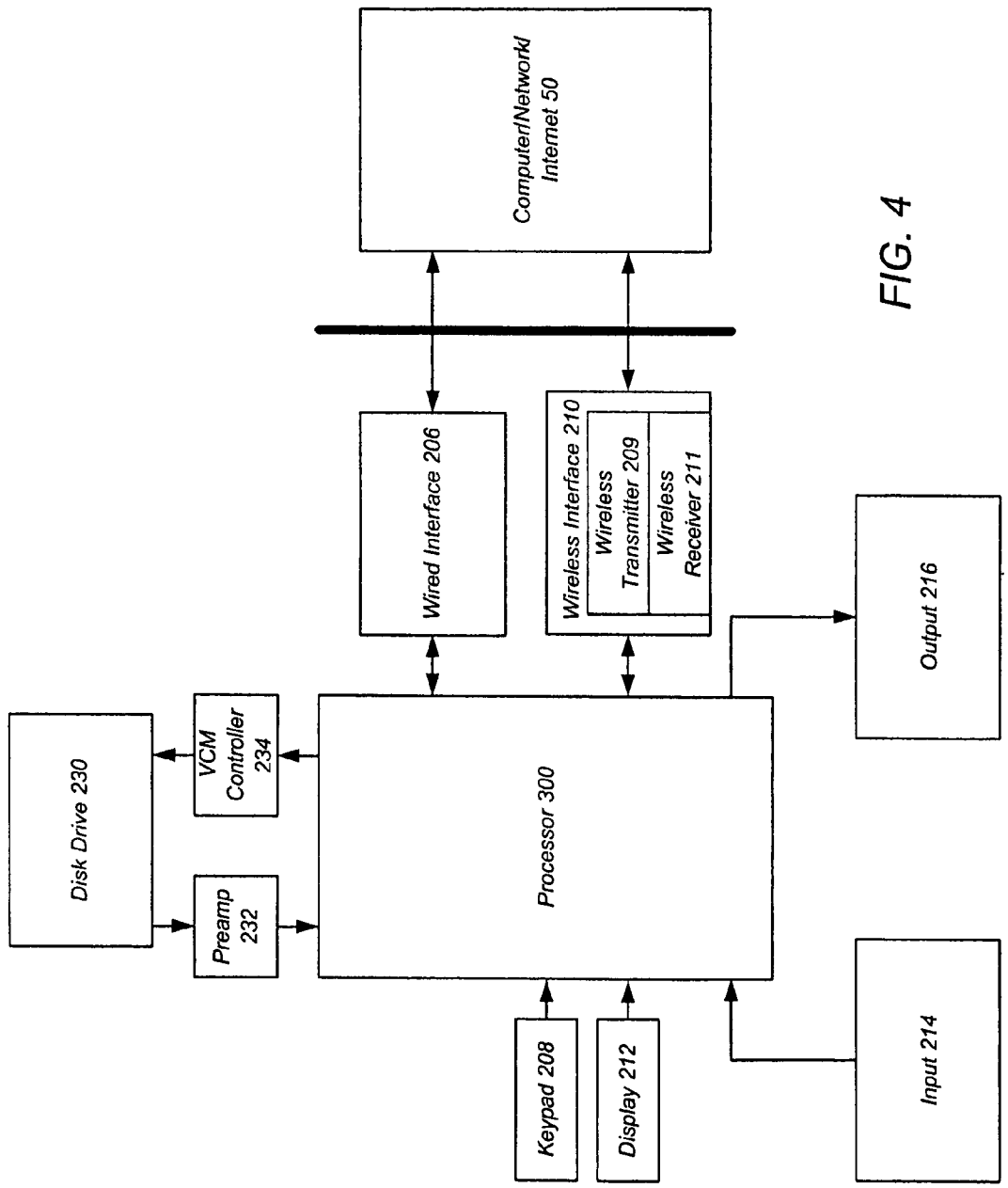
FIG. 4 is a block diagram of a second embodiment of a media player/recorder in accordance with the present invention.
Figure 5:
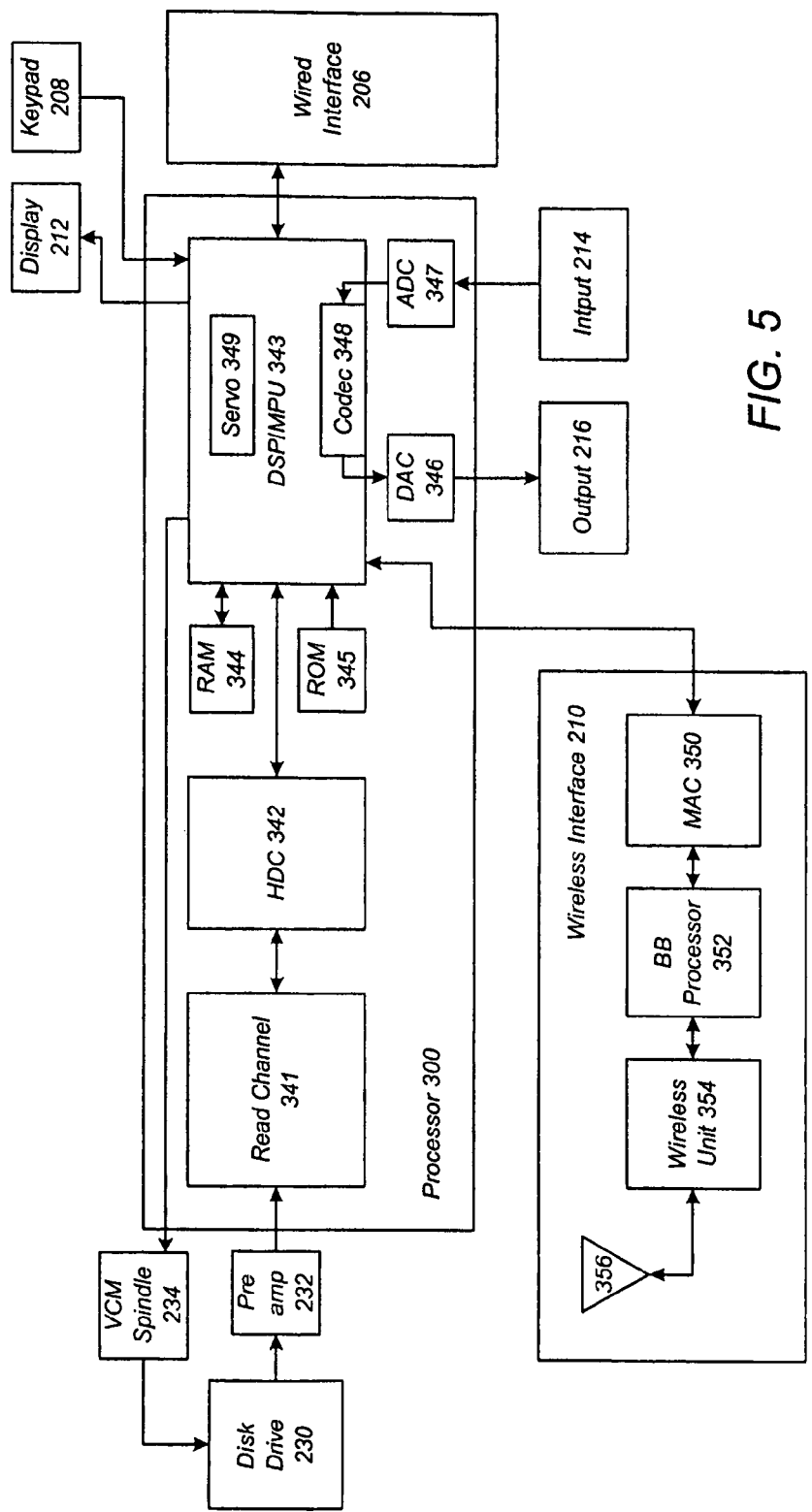
FIG. 5 is a more detailed block diagram of the media player/recorder of FIG. 4.

FIGS. 4 and 5 show a second embodiment of the present invention. The second embodiment is similar to the first embodiment except the second embodiment does not include memory 202. In this embodiment media data is recorded in a similar manner as the first embodiment and no further discussion is provided herein. For playback operation, the media data is retrieved directly from disk drive 230 for playback through output 216. The other portions of the playback operation are similar to the first embodiment. In the second embodiment disk drive 230 will be powered on any time media data is recorded or played back. As such this embodiment is particularly applicable when the power supply is external. For example the media player/recorder of the second embodiment may be a portable device used in an automobile supply by energy therefrom. In some implementations, MAC 350 includes an embedded microprocessor.

Figure 13:
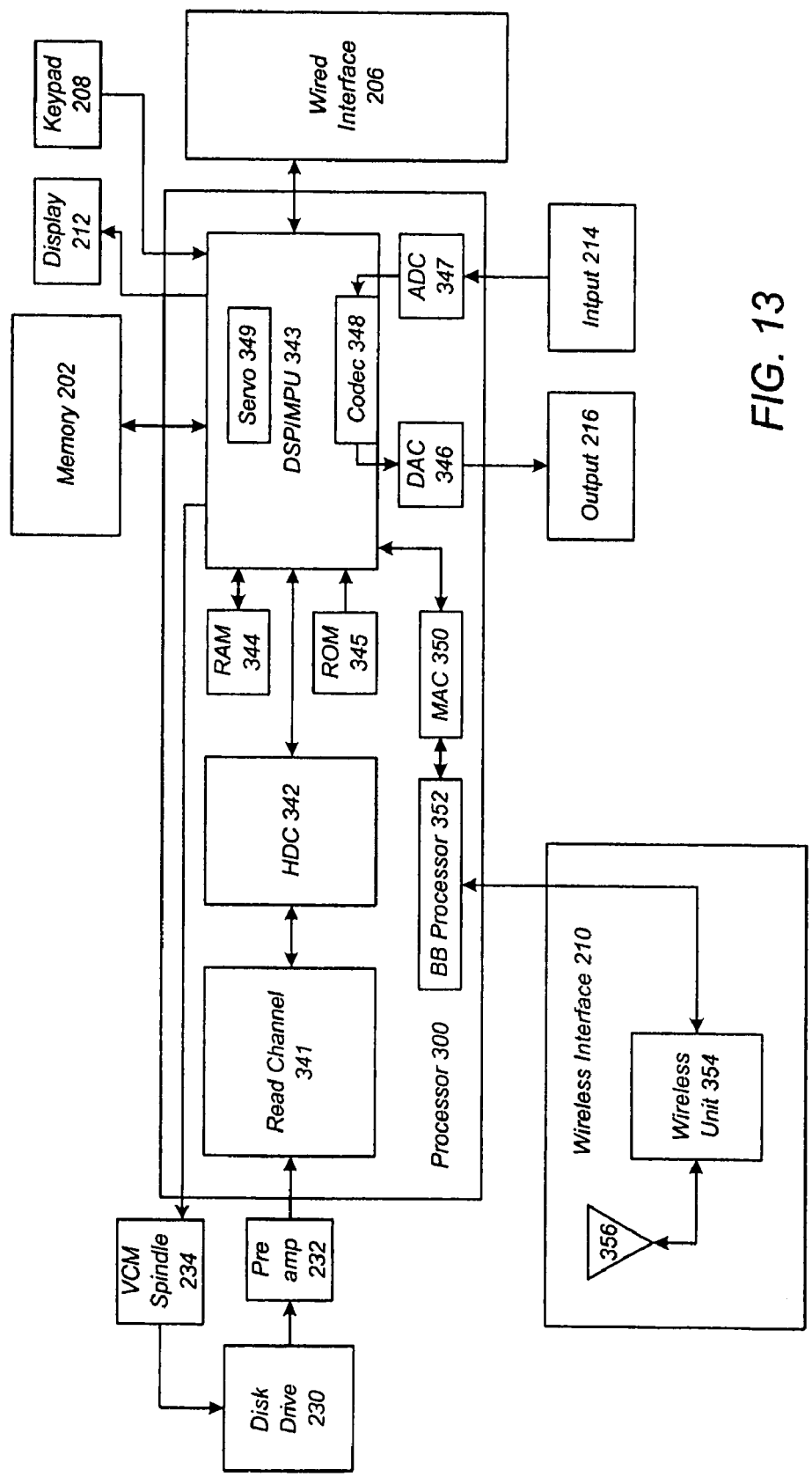
FIG. 13 shows a variation of the first embodiment of the media player/recorder of FIG. 2.

FIG. 13 shows a variation of the first embodiment. According to this variation, baseband processor 352 and MAC 350 are implemented within processor 300, preferably as a single integrated circuit. Wireless interface 210 includes antenna 356 and wireless unit 354. This variation operates as described for the first embodiment. In some implementations, MAC 350 includes an embedded microprocessor.

Figure 14:
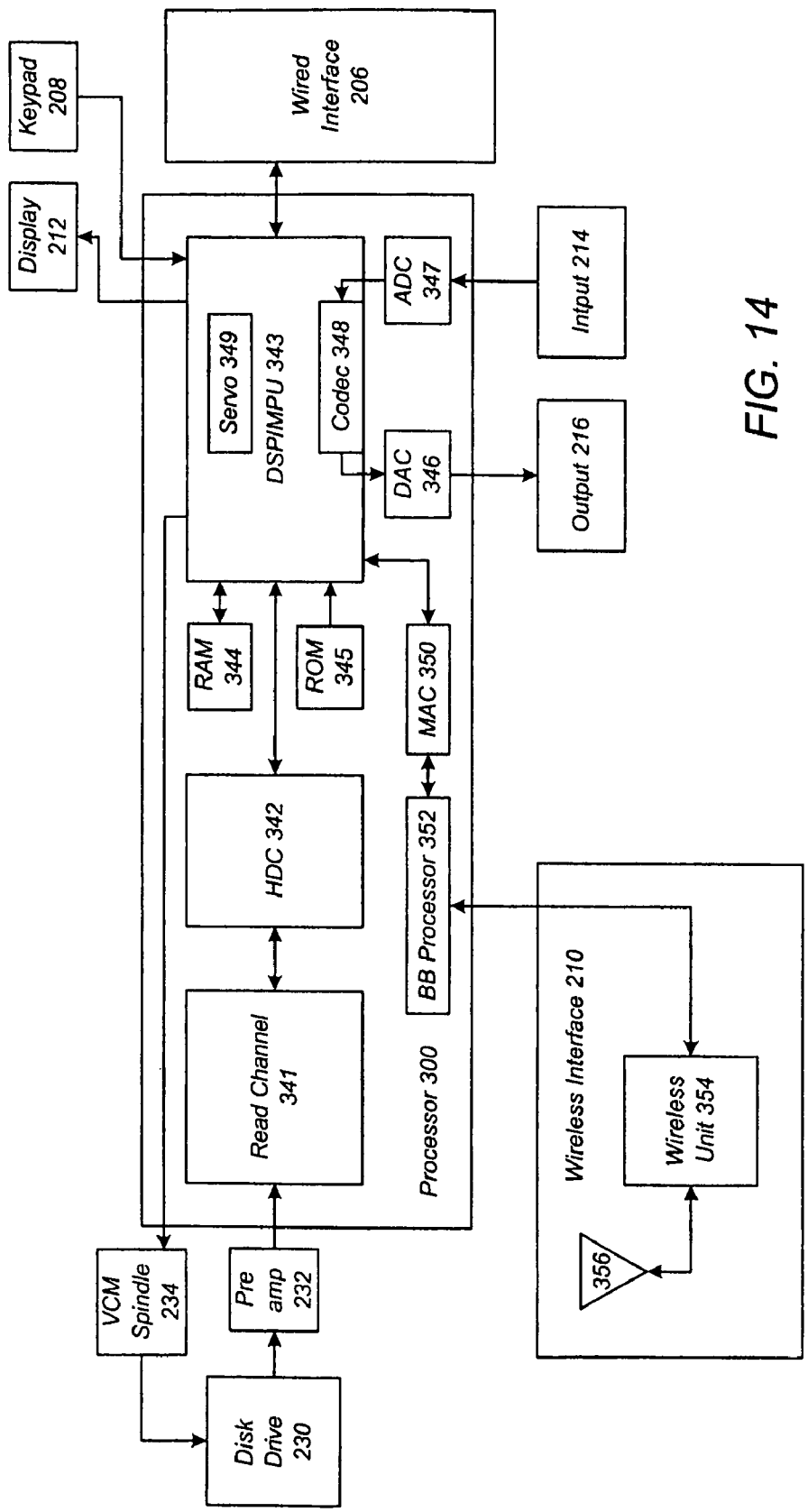
FIG. 14 shows a variation of the second embodiment of the media player/recorder of FIG. 2.

FIG. 14 shows a variation of the second embodiment. According to this variation, baseband processor 352 and MAC 350 are implemented within processor 300, preferably as a single integrated circuit. Wireless interface 210 includes antenna 356 and wireless unit 354. This variation operates as described for the first embodiment. In some implementations, MAC 350 includes an embedded microprocessor.

Figure 15:
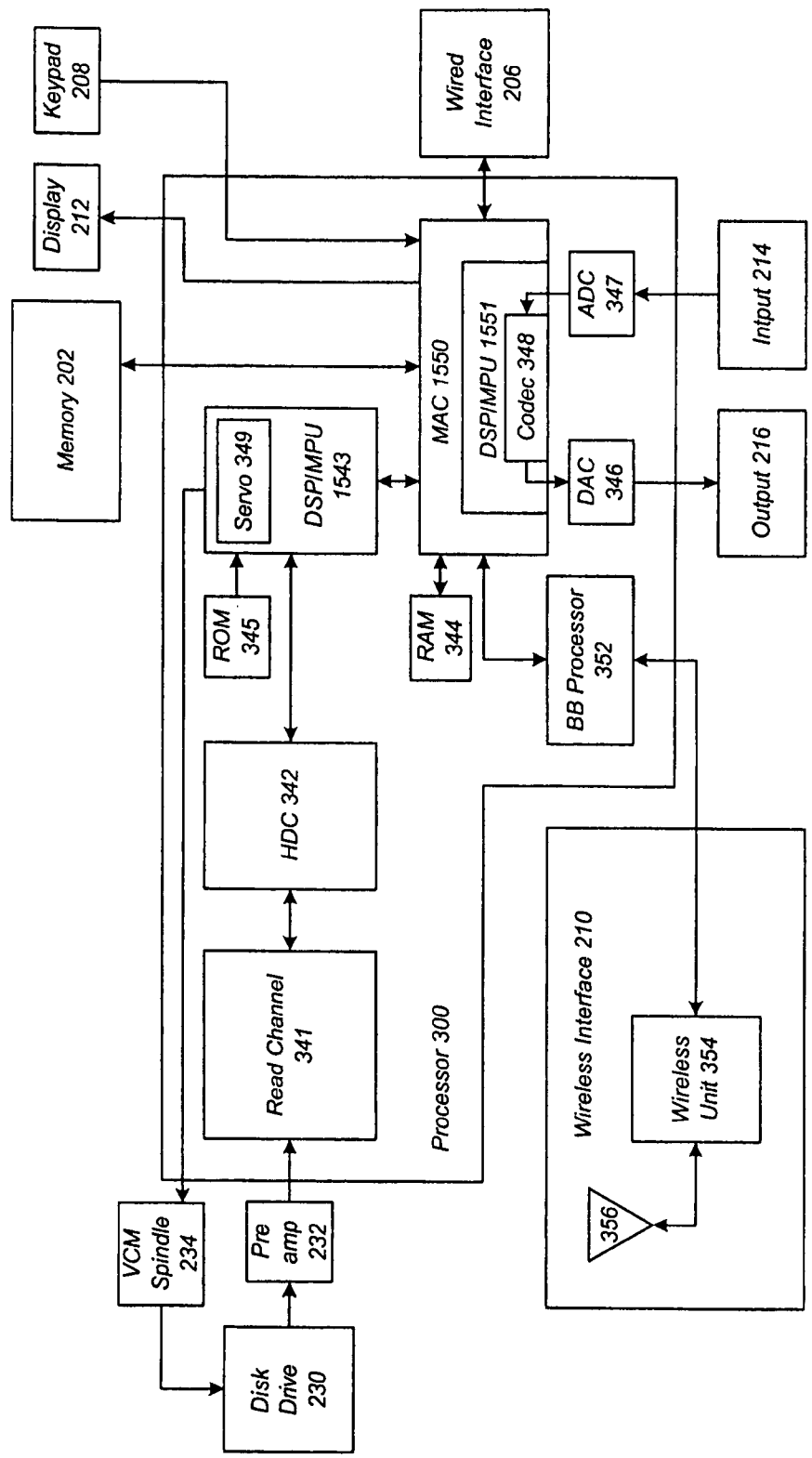
FIG. 15 is a block diagram of a third embodiment of a media player/recorder in accordance with the present invention.

FIG. 15 is a block diagram of a third embodiment of a media player/recorder in accordance with the present invention. According to this embodiment, a MAC 1550 is implemented within processor 300, which is preferably implemented as a single integrated circuit, and includes an embedded digital signal processor and microprocessor unit (DSP/MPU) 1551. DSP/MPU 1551 includes codec 348, and communicates with memory 202, display 212, keypad 208, wired interface 206, RAM 344, DAC 346, and ADC 347, which function as described above with reference to FIG. 3. DSP/MPU 343 has been replaces with DSP/MPU 1543, which controls disk drive 230, read channel 341, and HDC 342 as described above.

Figure 16:
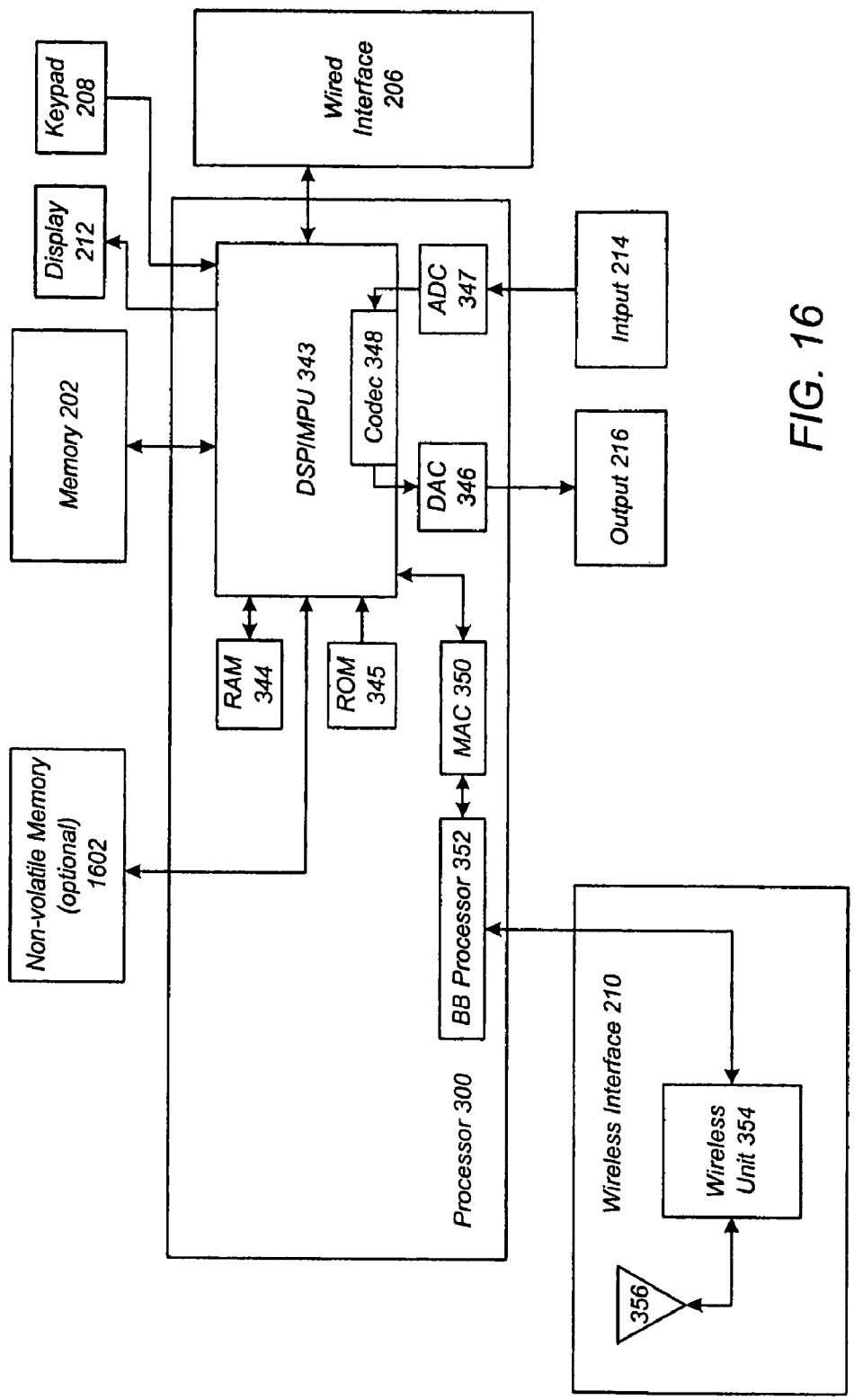
FIG. 16 is a block diagram of a fourth embodiment of a media player/recorder in accordance with the present invention.

FIG. 16 is a block diagram of a fourth embodiment of a media player/recorder in accordance with the present invention. This embodiment is similar to the above embodiments, but has no hard drive. Some implementations of this embodiment optionally include a non-volatile memory 1602 such as a flash memory instead of a hard drive. Consequently the circuits associated with the hard drive are also eliminated, resulting in a less-expensive media player/recorder. In the depicted implementation, baseband processor 352 and MAC 350 are implemented within processor 300, which is preferably implemented as a single integrated circuit. In other implementations, baseband processor 352 and MAC 350 are implemented separately from processor 300, for example, within wireless interface 210. In some implementations, MAC 350 includes an embedded DSP/MPU. These implementations operate in a manner similar to that described for the implementations of FIG. 15.

The implementations using non-volatile memory instead of a hard drive are especially useful for receiving streaming media from broadcasts such as internet radio stations and other media player recorders. Some implementations feature a "broadcast" mode where the media player/recorder plays a media selection and wirelessly transmits the media selection, either compressed or uncompressed, or in analog form, such that other media player/recorders can receive the broadcast media and play it at the same time as the broadcasting player/recorder.

Figure 17:
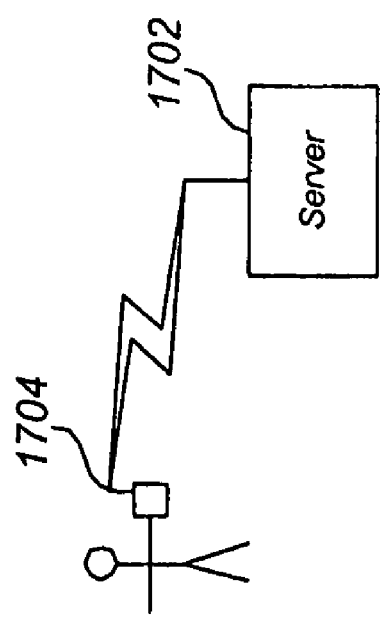
FIG. 17 illustrates a mode of some implementations referred to as "local radio mode."

The implementations with no hard drive or non-volatile memory are especially useful in a "local radio" mode where the media to be played is stored on a personal computer, server, or the like that is separate from the media player/recorder. FIG. 17 illustrates the local radio mode. In this mode, the media is wirelessly streamed to the media player/recorder 1704, which decompresses and plays the media without storing the media. Because the media player/recorder never stores a copy of the media, it is ideal for playing media for which only a single copy is licensed. The single copy is stored on a personal computer (PC) 1702, and is streamed to media player/recorder 1704 for playback. Because only a single copy of the media is stored, the single-copy license is satisfied.

Figure 18:
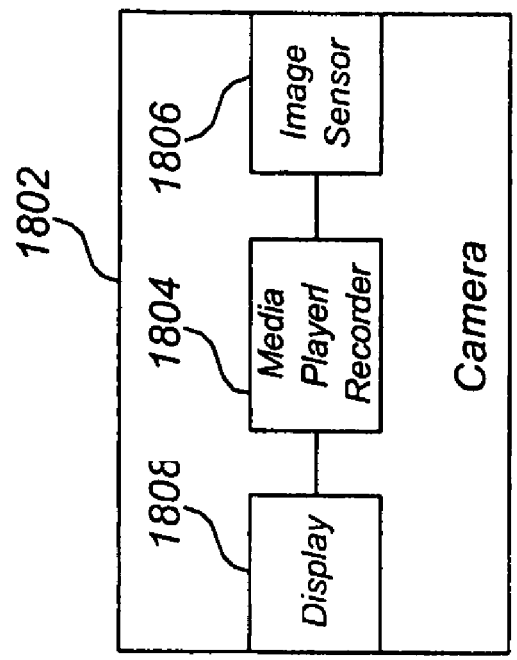
FIG. 18 shows an implementation where a media player/recorder is implemented within a digital camera.

FIG. 18 shows an implementation where a media player/recorder 1804 is implemented within a digital camera 1802. In recording mode, an image sensor 1806 within camera 1802 captures one or more images, and passes a signal representing the image to media player/recorder 1804. If the signal is analog, a analog-to-digital converter within media player/recorder 1804 converts the analog signal to a digital signal. A digital signal processor within media player/recorder 1804 then encodes the digital signal. The encoding can include image compression, image manipulation, and the like. A storage controller within media player/recorder 1804 stores the encoded image data on a storage device. In some implementations, digital camera 1802 is a digital motion picture camera and the encoded image data represents a motion picture.

Figure 19:
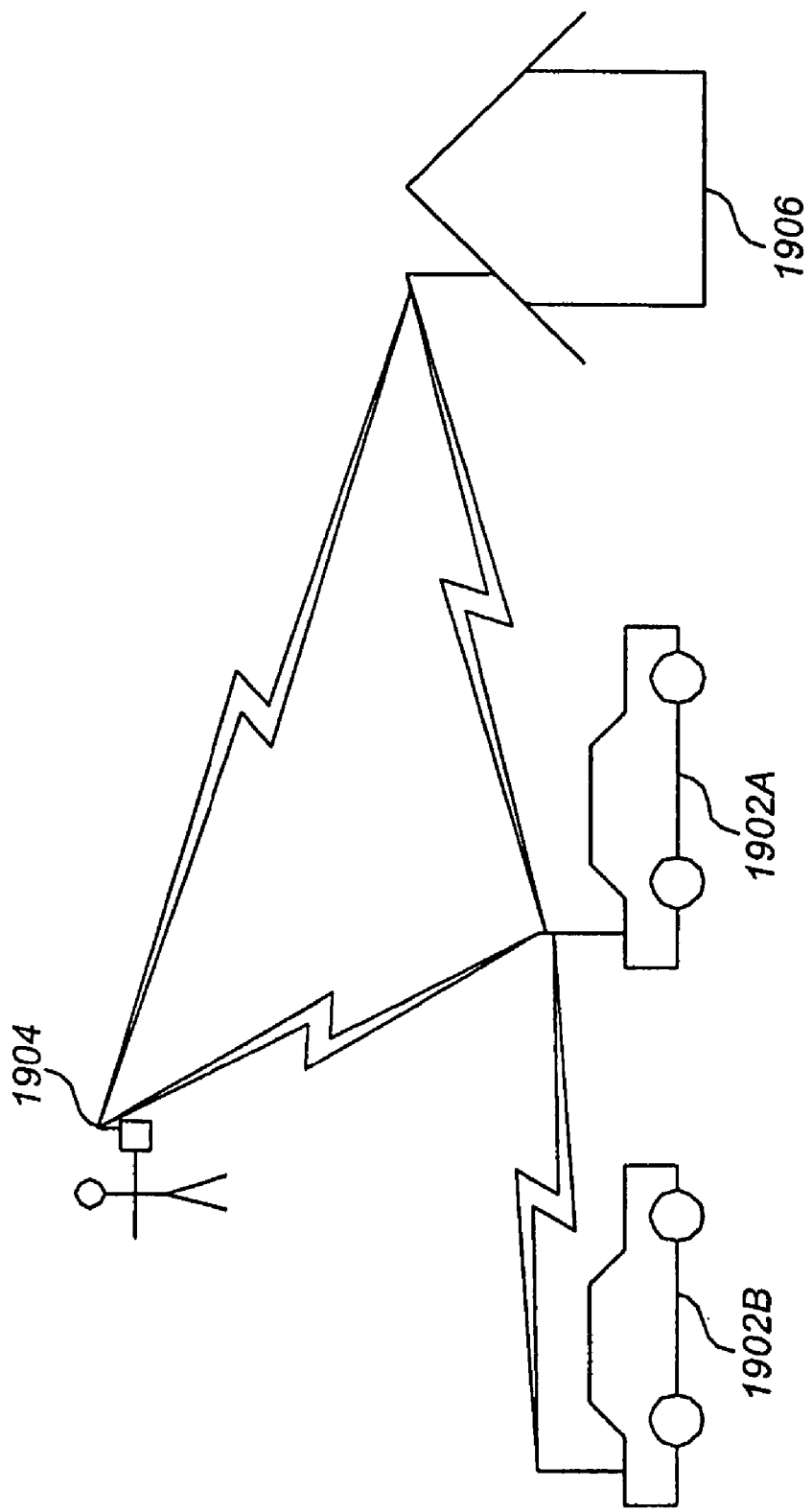
FIG. 19 shows automobiles equipped with a media player/recorder in accordance with the present invention.

In playback mode, the storage controller retrieves the encoded image data from the storage device. The digital signal processor decodes the retrieved encoded image data. Media player/recorder 1804 sends a signal representing the decoded image data to a display 1808, which displays the image(s) captured by image sensor 1806. A The media player/recorder described herein can be implemented as a portable unit, as a permanently mounted unit within a vehicle such as an automobile, and the like. FIG. 19 shows automobiles 1902A and 1902B equipped with such a media player/recorder. In this implementation, the antenna of the automobile can serve as the antenna of the media player/recorder. The media player/recorders in the automobiles 1902 can communicate with each other, without user intervention, while traveling near each other, while stopped at intersections, and in other similar scenarios, to share media data, items of interest, and the like. The media player/recorders in the automobiles 1902 can also communicate with portable media player/recorders 1904 in a similar fashion. The vehicular and portable media player/recorders can communicate with a stationary base station 1906 to share media over a network such as the Internet. For example, a homeowner can equip his garage with such a base station 1906 so the media player/recorder in his automobile can share media and items of interest while parked in the garage during the night. Similarly, a user of a portable player/recorder 1904 can equip his home with a base station 1906 so the media player/recorder 1904 can share media and items of interest while not otherwise in use, for example while the user sleeps.

Some implementations receive and store data other than media data. In some implementations the media player/recorder records biometric data collected by a biometric sensor disposed near, upon, or within a human body or other organism. The biometric data can represent biological functions such as breathing, heart function, body temperature, blood pressure, and the like. Such devices and methods are well-know in the relevant arts, and are described in U.S. Pat. No. 6,023,662 entitled "Measurement Device, Portable Electronic Instrument, And Measurement Method," issued Feb. 8, 2000; U.S. Pat. No. 6,030,342 entitled "Device For Measuring Calorie Expenditure And Device For Measuring Body Temperature," issued Feb. 29, 2000; U.S. Pat. No. 6,036,653 entitled "Pulsimeter," issued Mar. 14, 2000; and U.S. Pat. No. 6,081,742 entitled "Organism State Measuring Device and Relaxation Instructing Device," issued Jun. 27, 2000, the disclosures thereof incorporated by reference herein in their entirety.

Figure 21:
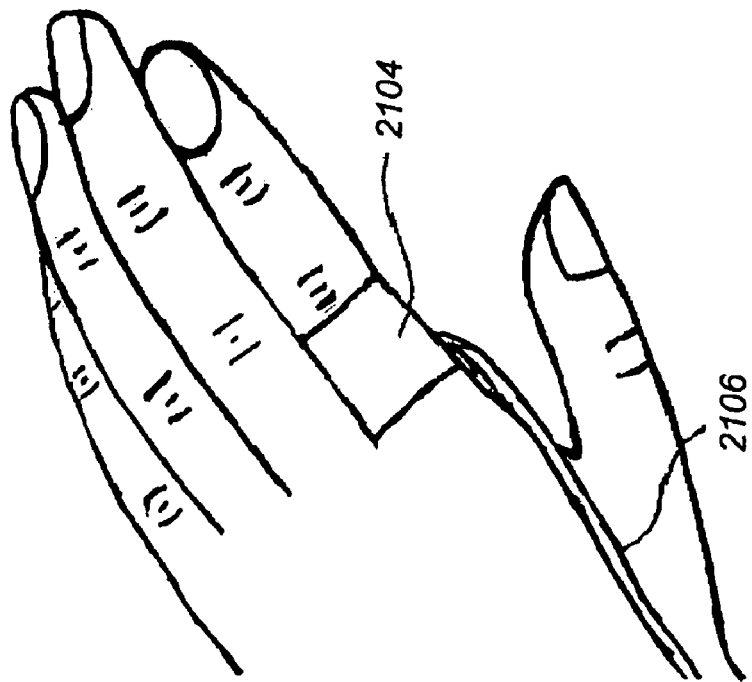
FIG. 21 show a biometric sensor worn on a finger and transmitting biometric data over a cable.
Figure 20:
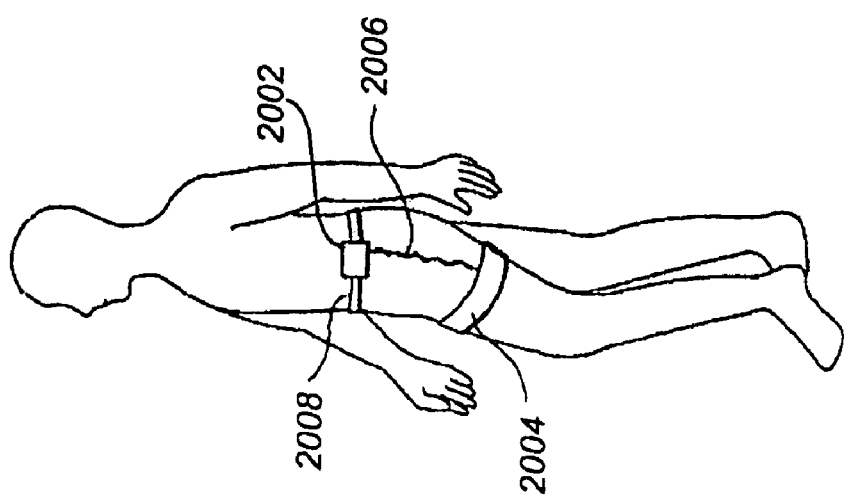
FIG. 20 shows an implementation where a media player/recorder communicates with a biometric sensor over a cable.

FIG. 20 shows an implementation where a media player/recorder 2002 communicates with a biometric sensor 2004 over a cable 2006. The biometric data collected by biometric sensor 2004 is passed to media player/recorder 2002 over cable 2006. Alternatively, the biometric data can be passed to media/player recorder 2002 wirelessly. The data can be passed in analog or digital form, and is received and stored by media/player recorder 2002 according to the methods described above. In FIG. 20 the biometric sensor is worn on the leg. Of course, the biometric sensor can be worn in other locations. FIG. 21 show a biometric sensor 2104 worn on a finger and transmitting biometric data over a cable 2106.

According to these implementations, a user of the media player/recorder can record biometric data for later use in diagnosis and treatment of intermittently occurring medical conditions such as heart arrhythmia. When the user subsequently visits a doctor, the media player/recorder can transmit the stored biometric data to the doctor's computer for analysis, by wire or wirelessly.

Figure 22:
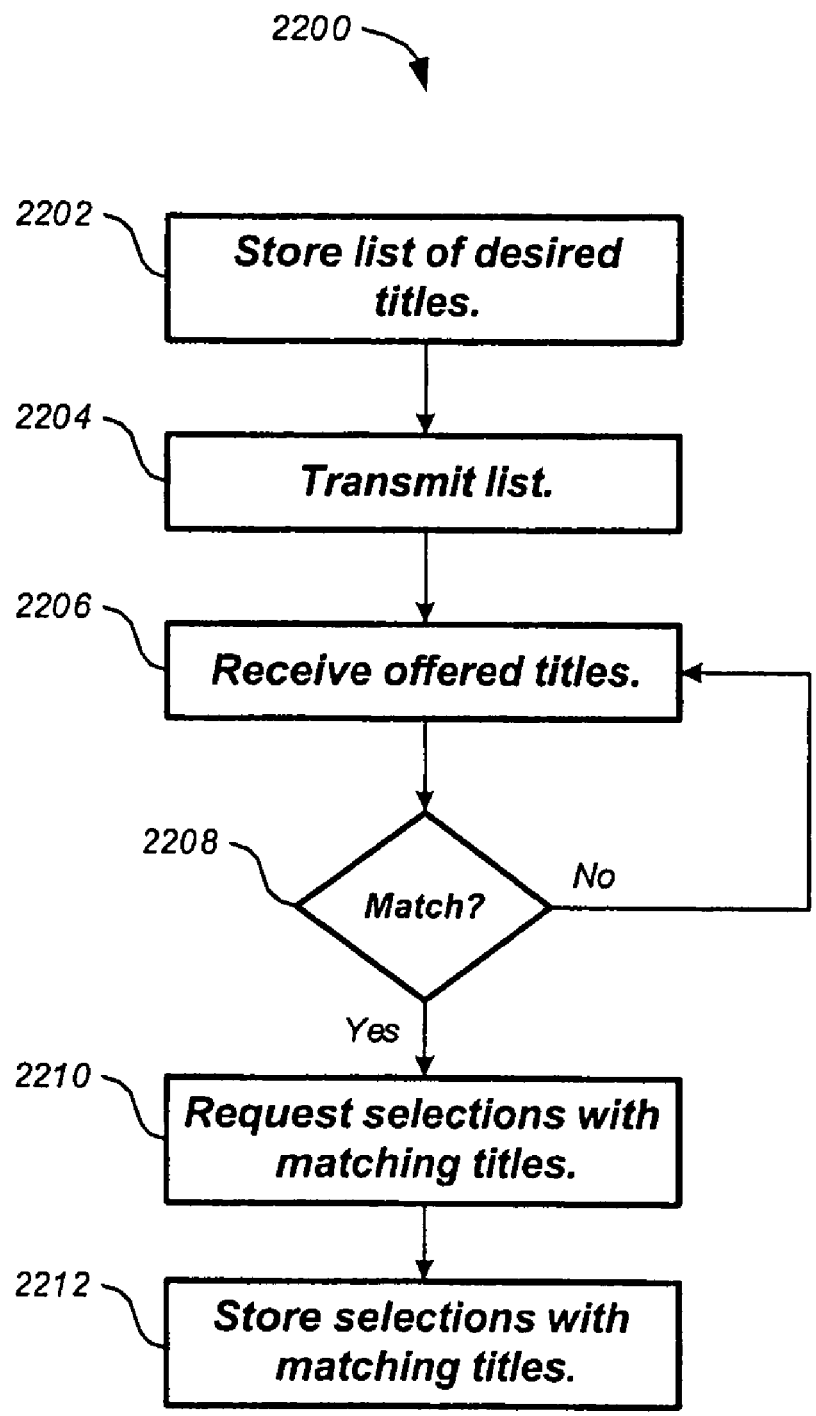
FIG. 22 shows a process for a media player/recorder to acquire shared media.
Figure 23:
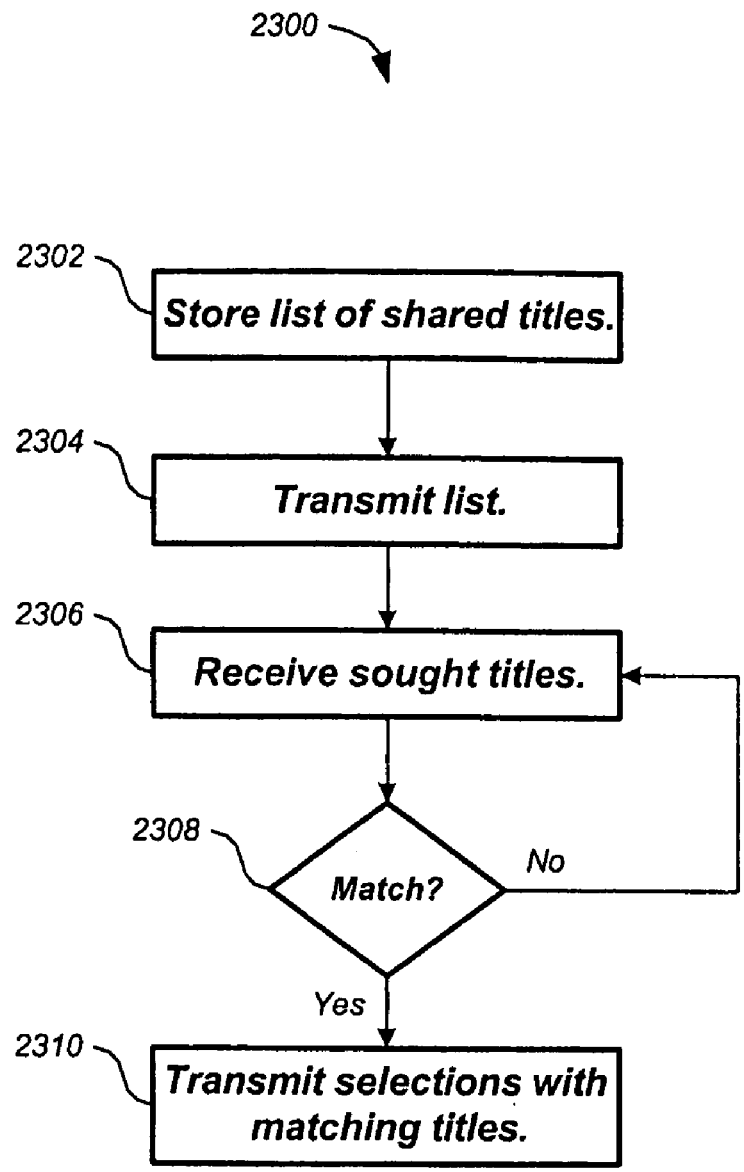
FIG. 23 shows a process for a media player/recorder to share media.

Some implementations feature a "share" mode in which media stored on one media player/recorder can be shared with other media player recorders using wireless data transmissions over wireless interface 210. FIGS. 22 and 23 show methods for such sharing. Of course, media can be shared over wired interface 206 as well using similar methods. However, these methods are well-suited for the relatively lower data rates of wireless links because they require little user intervention. These methods can be used not only to share media between player/recorder units, but also with other repositories of media, such as remote network servers and the like.

FIG. 22 shows a process 2200 for a media player/recorder to acquire shared media. A list of identifiers of desired media selections, such as song titles, is stored within the player/recorder (step 2202). A user can generate the list using the keypad, download the list from a computer, or the like. Optionally, the wireless transmitter can transmit a signal representing the list (step 2204). Other player/recorder units receive the list, and respond by offering media selections on the list. The wireless receiver receives the titles of the offered media selections (step 2206). The offered titles are compared to the desired titles (step 2208). The player/recorder optionally transmits a signal requesting the selections having matching titles (step 2210). Other player/recorders respond by transmitting the requested selections. The player/recorder receives the requested selections, and stores the received selections (step 2212).

The player/recorder can obtain selections shared by a broadcaster that simply transmits a title of a media selection, and then transmits the selection, without first waiting to receive lists of desired titles or requests for media selections having matching titles. In this case optional steps 2204 and 2210 are not needed.

FIG. 23 shows a process 2300 for a media player/recorder to share media. A list of identifiers of shared media selections, such as song titles, is stored within the player/recorder (step 2302). A user can generate the list using the keypad, download the list from a computer, or the like. Optionally, the wireless transmitter can transmit a signal representing the list (step 2304). Other player/recorder units receive the list, and respond by requesting media selections on the list. The wireless receiver receives the titles of the sought media selections (step 2306). The sought titles are compared to the shared titles (step 2308). The player/recorder transmits the selections having matching titles (step 2310).

Figure 24:
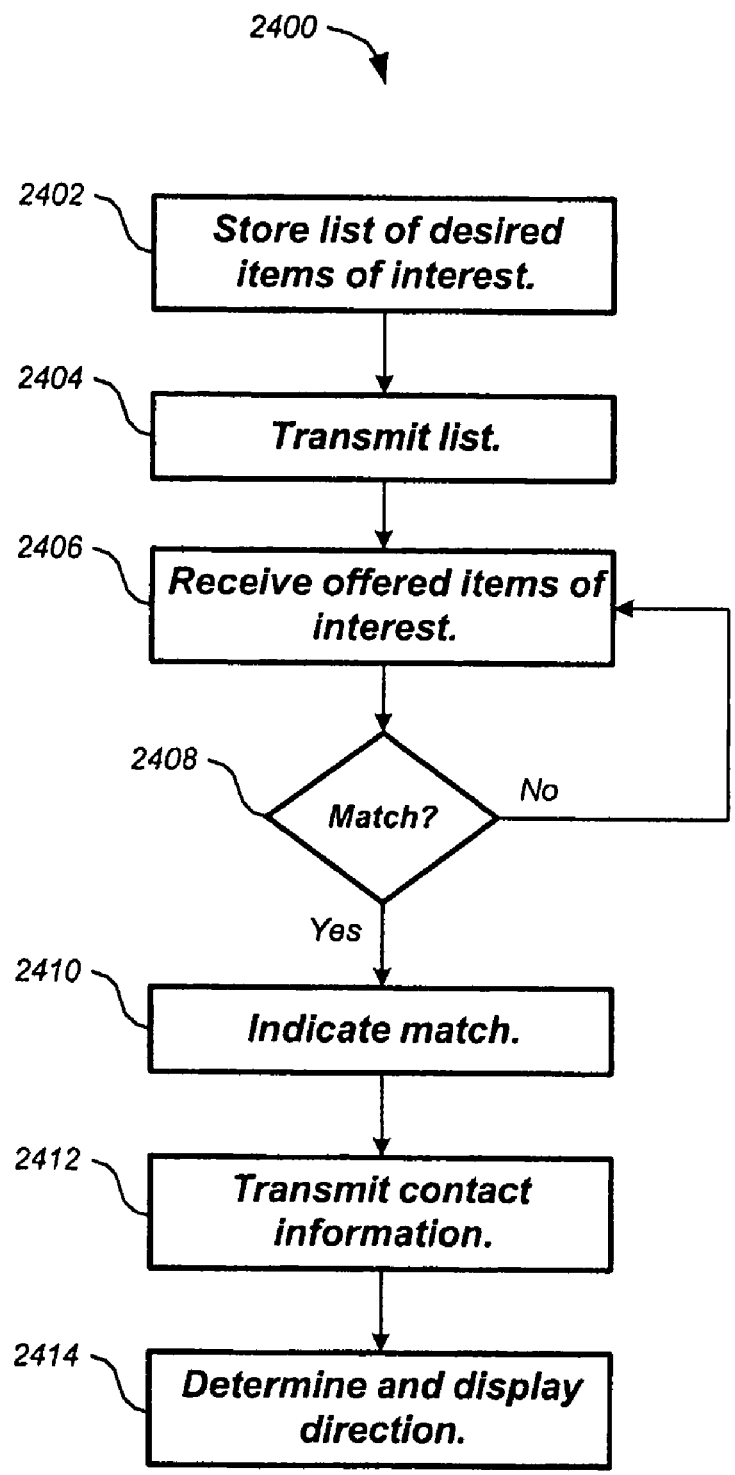
FIG. 24 shows a process for a media player/recorder to match items of interest.

Some implementations feature an "interest matching" mode in which items of interest stored on one media player/recorder can be shared with other media player recorders using wireless data transmissions over wireless interface 220. Items of interest include interests such as hobbies and sports, items for sale or rent, requests for items for sale or rent, musical preferences and the like. When a match is made, the display units indicate the match, and the media player/recorders can wirelessly exchange contact information such as email addresses, telephone numbers and the like. Some implementations include a directional antenna to allow the users having matched items of interest to locate each other. Of course, interests can be matched over wired interface 216 as well using similar methods. FIG. 24 shows methods for such interest matching.

FIG. 24 shows a process 2400 for a media player/recorder to match items of interest. A list of desired items of interest is stored within the player/recorder (step 2402). A user can generate the list using the keypad, download the list from a computer, or the like. Optionally, the wireless transmitter can transmit a signal representing the list (step 2404). The wireless receiver receives offered items of interest from other player/recorders (step 2406). The offered items of interest are compared to the desired items of interest (step 2408). When compared items of interest match, the display unit indicates a match (step 2410). Optionally the player/recorder transmits contact information to the transmitter of the offered item of interest (step 2412). Optionally, the player/recorder determines and displays a direction to the transmitter of the offered item of interest (step 2414). The player/recorder can also include a range finder circuit to determine a range to the transmitter of the offered item of interest, which is then displayed.

Figure 25:
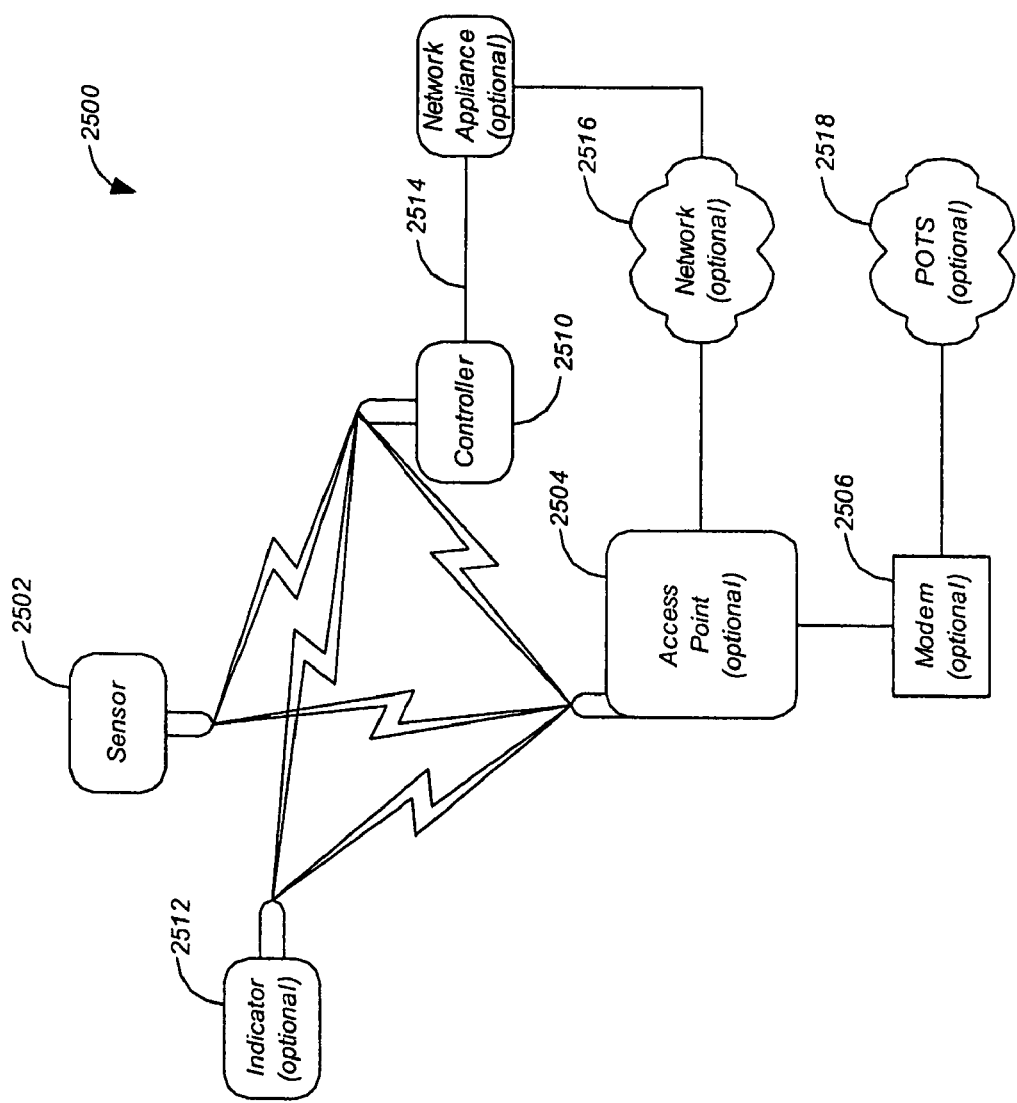
FIG. 25 shows an alarm system according to an embodiment of the present invention.

FIG. 25 shows an alarm system 2500 according to an embodiment of the present invention. Alarm system 2500 comprises a controller 2510, one or more sensors 2502, one or more actuators 2508, and one or more optional alarm indicators 2520 such as sirens, flashers, and the like. Each sensor 2502 generates a sensor signal that represents alarm conditions. Controller 2510 receives the sensor signal, generates a report signal that represents the alarm conditions, and optionally transmits the report signal to an optional master unit such as a network appliance 2512, personal computer (PC), or the like over a channel 2514 that can be a wireless link or a wire, cable, or the like.

Alarm system 2500 has many uses including intruder alarm systems, fire and smoke detectors, and the like. A single controller 2510 can receive data from one or more sensors 2502, and can control one or more sensors 2502, for example for purposes such as calibration of sensors 2502. Network appliance 2512 can communicate with multiple controllers 2510. Controller 2510 and sensors 2502 can be fabricated as separate units or as a single alarm monitor unit.

Controller 2510 can operate independently or in conjunction with network appliance 2512. When operating in conjunction with network appliance 2512, controller 2510 collects data from sensors 2502 and reports the data to network appliance 2512. In some embodiments, controller 2510 regularly reports the data to network appliance 2512. In some embodiments network appliance 2512 polls controller 2510. In other embodiments, controller 2510 only reports the data to network appliance 2512 when the data meets one or more predetermined conditions, which can be downloaded from network appliance 2512. For example, in an intruder alarm system where sensor 2502 is a motion detector, controller 2510 transmits a report signal to network appliance 2512 only when sensor 2502 detects motion. In some embodiments, controller 2510 can report data from a second sensor when data from a first sensor meets one or more predetermined conditions. For example, in an intruder alarm system where sensors 2502 include a motion detector and a camera, controller 2510 can transmit data captured by the camera when the motion detector detects motion.

In some embodiments, controller 2510 features a low-power sleep mode where one or more elements of controller 2510, such as a processor and so on, enters the sleep mode when the sensor signal meets a predetermined condition for a predetermined interval. When the sensor signal no longer meets the further predetermined condition, the sleeping elements leave the sleep mode and controller 2510 can transmit the report signal.

When operating independently, controller 2510 can rely on data previously provided by network appliance 2512 such as predetermined conditions previously downloaded. In some embodiments, controller 2510 causes an alarm indicator 2520 to produce an audible or visual alarm indication in response to controller 2510 when a predetermined condition is met. In other embodiments, system 2500 operates as a silent alarm system, instead reporting events over an optional plain old telephone system (POTS) 2518 or an optional network 2516 such as a LAN, MAN, WAN, the Internet, or the like.

Controller 2510 can communicate over wired or wireless channels. Wireless implementations can be ad hoc or infrastructure. Infrastructure implementations include an access point 2504, which can also communicate with network 2516, and with POTS 2518 over a modem 2506. In such implementations, controller 2510 and access point 2504 can be fabricated separately or as a single unit.

In embodiments including an optional display, controller 2510 can display information such as the status of controller 2510, the status of sensors 2502, and so on. In embodiments including an optional keypad, a user can operate the keypad to alter the operation of controller 2510, for example by changing the conditions for the sleep mode and for transmitting the report signal. In other embodiments the user can alter the operation of controller 2510 by speaking a command aloud. This sound is captured by an input circuit, and interpreted as a control signal.

Alarm system 2500 has many uses. For example, in embodiments where alarm system 2500 comprises a fire alarm system, sensors 2502 can comprise thermometers, smoke detectors, and the like. In embodiments where alarm system 2500 comprises a gas alarm system, sensors 2502 can comprise carbon monoxide detectors and other gas detectors. In embodiments where alarm system 2500 comprises an intruder alarm system, sensors 2502 can comprise motion detectors, glass breakage detectors, and trip sensors to detect the opening of a window or door. In embodiments where alarm system 2500 comprises an earthquake reporting system, sensors 2502 can comprise seismometers and the like. In embodiments where alarm system 2500 comprises a weather reporting system, sensors 2502 can comprise thermometers, barometers, rain gauges, and other weather instruments.

Other such systems are within the scope of the present invention and will be apparent to one skilled in the relevant arts after reading this description.

Figure 26:
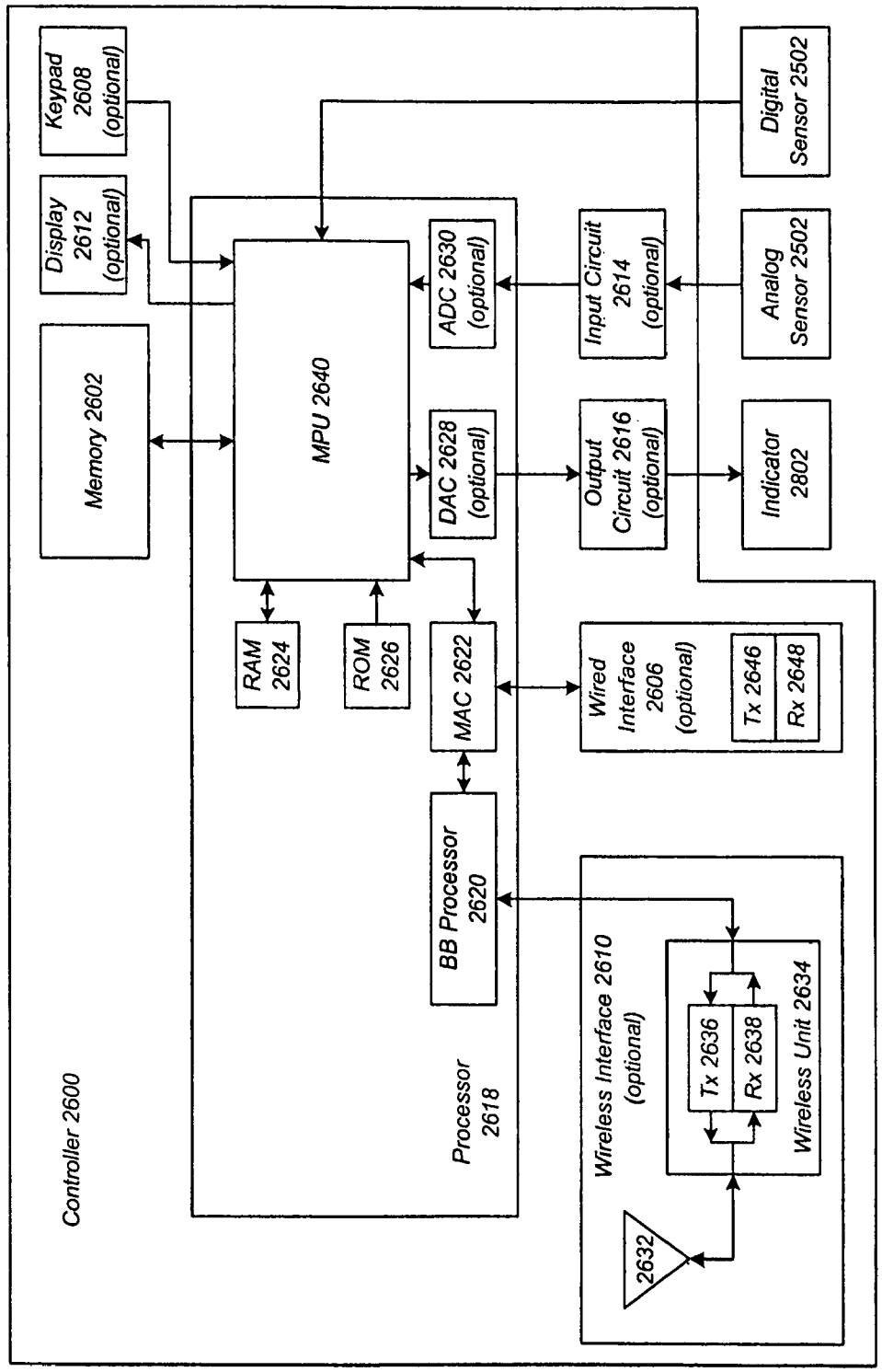
FIG. 26 shows a controller according to an embodiment of the present invention.

FIG. 26 shows a controller 2600 according to an embodiment of the present invention that can function as controller 2510 of FIG. 10. Controller 2600 includes a processor 2618 that includes a microprocessor unit (MPU) 2640, a volatile memory such as random access memory (RAM) 2624, a non-volatile memory such as read only memory (ROM) 2626, an optional digital to analog converter (DAC) 2628, an optional analog to digital converter (ADC) 2630, a media access controller (MAC) 2622, and a baseband processor 2620. Processor 2618 is preferably implemented as a single integrated circuit. A controller having a processor implemented as a single integrated circuit can be fabricated at lower cost and have lower energy consumption. Alternatively, processor 2618 can be implemented by discrete components. In some embodiments, processor 2618 is implemented together with one or more sensors 2502 as a single integrated circuit.

MPU 2640 can comprise a microprocessor unit, a digital signal processor, or any combination thereof. ROM 2626 stores programmed instructions for processor 2618 and MPU 2640. RAM 2626 is provided as a working memory for MPU 2640.

Controller 2600 also includes an interface, which can be a wired interface 2606, a wireless interface 2610, or a combination of the two. Controller 2600 further includes a memory 2602, an optional input circuit 2614, an optional output circuit 2616, an optional keypad 2608, and an optional display 2612. Wireless interface 2610 includes a wireless antenna 2632 and a wireless unit 2610 that includes a wireless receiver 2638 and an optional wireless transmitter 2636. Wired interface 2606 includes a receiver 2646 and an optional transmitter 2648. Keypad 2608 can be fabricated together with display 2612 as a touch screen.

Memory 2602 comprises a solid state memory, such as, for example dynamic random access memory (solid state memory), flash memory, EEPROM, or the like. The amount of solid state memory supplied is selected to minimize energy consumption.

Antenna 2632 is a conventional antenna for receiving and transmitting wireless signals. Wireless unit 2610 converts wireless signals received by antenna 2632 to analog baseband signals, and converts analog baseband signals received from baseband processor 2620 to wireless signals for transmission by antenna 2632. Baseband processor 2620 converts analog baseband signals received from wireless unit 2610 to a digital bitstream, and converts a digital bitstream received from MAC 2622 to analog baseband signals, both according to well-known methods. MAC 2622 frames the digital bitstream produced by baseband processor 2620, and filters the frames to select the frames addressed to processor 2618, both according to well-known methods. MAC 2622 also converts frames received from processor 2618 to a digital bitstream for baseband processor 2620, also according to well-known methods. In some implementations, MAC 2622 includes an embedded microprocessor.

Digital data may be transferred between controller 2600 and a master unit such as network appliance 2512, a local area network, the Internet and the like, including wireless networks with infrastructure, such as a designated access point, peer-to-peer wireless networks, and the like. Such external devices communicate with the controller via wired interface 2606 and/or wireless interface 2610, which are controlled by processor 2618. Wired interface 2606 may be implemented, for example, as a parallel interface, serial interface, USB, Ethernet connection, IEEE 1394 (a.k.a. Firewire), and the like. Wireless interface 2610 may be implemented, for example, as an infrared interface, IEEE 802.15, IEEE 802.11, Bluetooth™ and the like. Some embodiments of the present invention comply with one or more of the following standards: IEEE 802.11; IEEE 802.11a; IEEE 802.11b; IEEE 802.11g; IEEE 802.11h; and IEEE 802.11i. Again, the present invention is independent of the interface selected. The digital data is then optionally stored in memory 2602. Processor 2618 can obtain digital data directly from a digital sensor 2502, or indirectly over wired interface 2606 or wireless interface 2610.

Alternatively, digital data may be obtained from an external analog source such as an analog sensor 2502 connected to input circuit 2614. Input circuit 2614 takes the input signal from the external device and sets the analog signal to an appropriate level. The analog signal is then converted to a digital signal by ADC 2630. The digital data can be stored in memory 2602.

Figure 27:
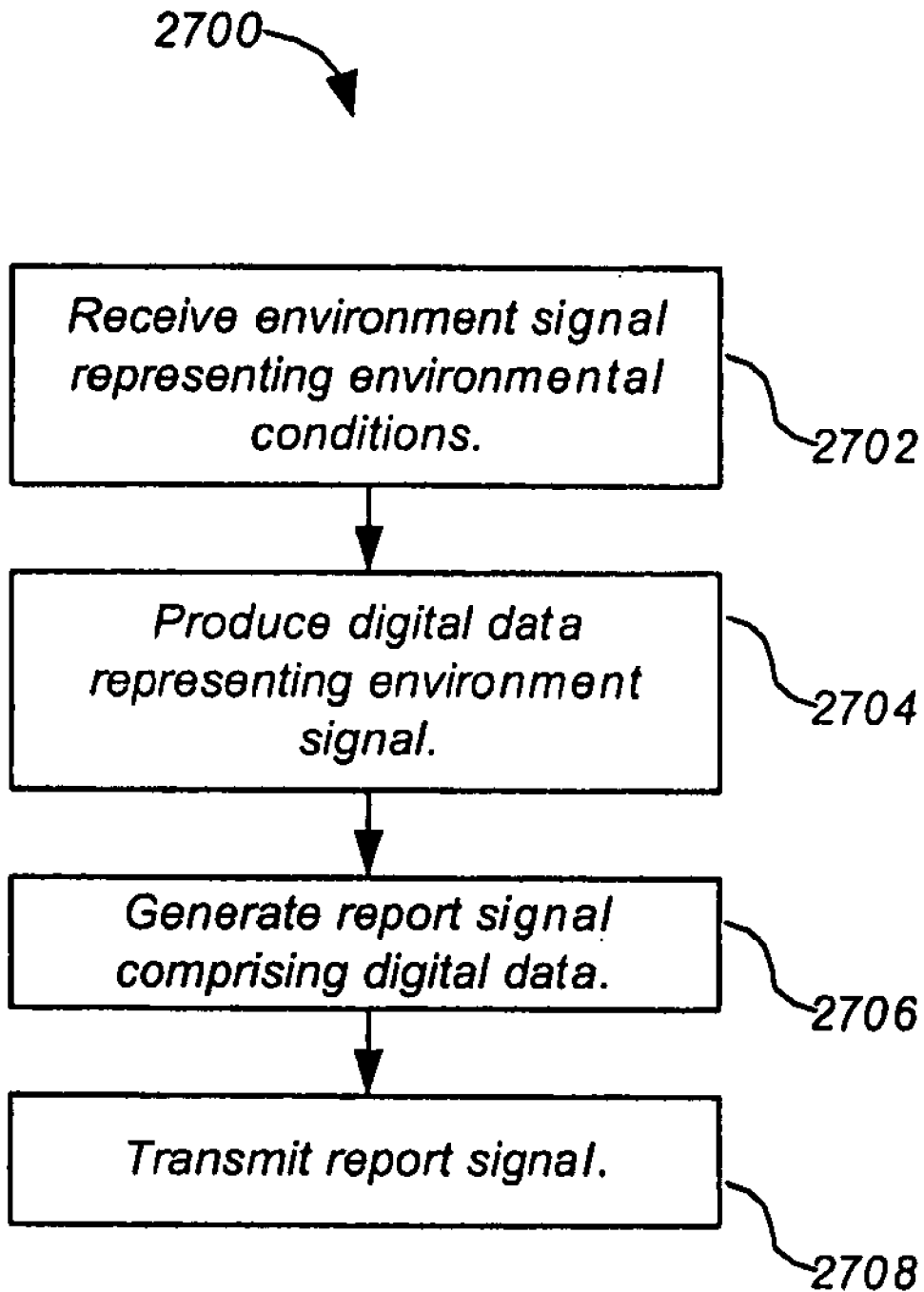
FIG. 27 shows a process that can be performed by the controller of FIG. 26 according to a preferred embodiment.

FIG. 27 shows a process 2700 that can be performed by controller 2600 according to a preferred embodiment. Operation of controller 2600 can be automatic, controlled by the user through optional keypad 2608, which is in communication with MPU 2640, or both. Status of the controller can be provided to the user by optional display 2612 in accordance with MPU 2640.

One or more sensors 2502 generate a sensor signal representing alarm conditions (step 2702). In embodiments where the sensor signal is digital, it can be received by interfaces 2606 and/or 2610. In embodiments where the sensor signal is analog, it can be received by input circuit 2614, which sets the signal to an appropriate level, and converted to a digital signal by ADC 2630. In either case, the sensor signal is passed to processor 2618 and optionally stored in memory 2602.

Processor 2618 produces digital data based on the sensor signal (step 2704). For example, the digital data can represent the sensor signal, or can simply represent an alert triggered by the sensor signal. Media access controller 2622 generates a report signal comprising the digital data according to well-known methods (step 2706).

When controller 2600 is in communication with a personal computer, network appliance, local area network, Internet, or the like, controller 2600 transmits a report signal comprising the digital data (step 2708). MPU 2640 controls the flow of the digital data through interfaces 2606 and/or 2610.

In some embodiments, media access controller 2622 generates a packet comprising the digital data, which is then transmitted. In some embodiments, media access controller 2622 generates an electronic mail message comprising the digital data which is then transmitted to a destination address that can be provided by network appliance 2512 or the like.

In some embodiments, controller 2510 and one or more actuators 2508 are implemented together for controlling a physical portal such as a window or door. In some embodiments, controller 2510 and actuators 2508 are implemented within the physical portal. In other embodiments, controller 2510 and actuators 2508 are implemented within a portal component, such as a lock, that can be installed in a portal.

Figure 28:
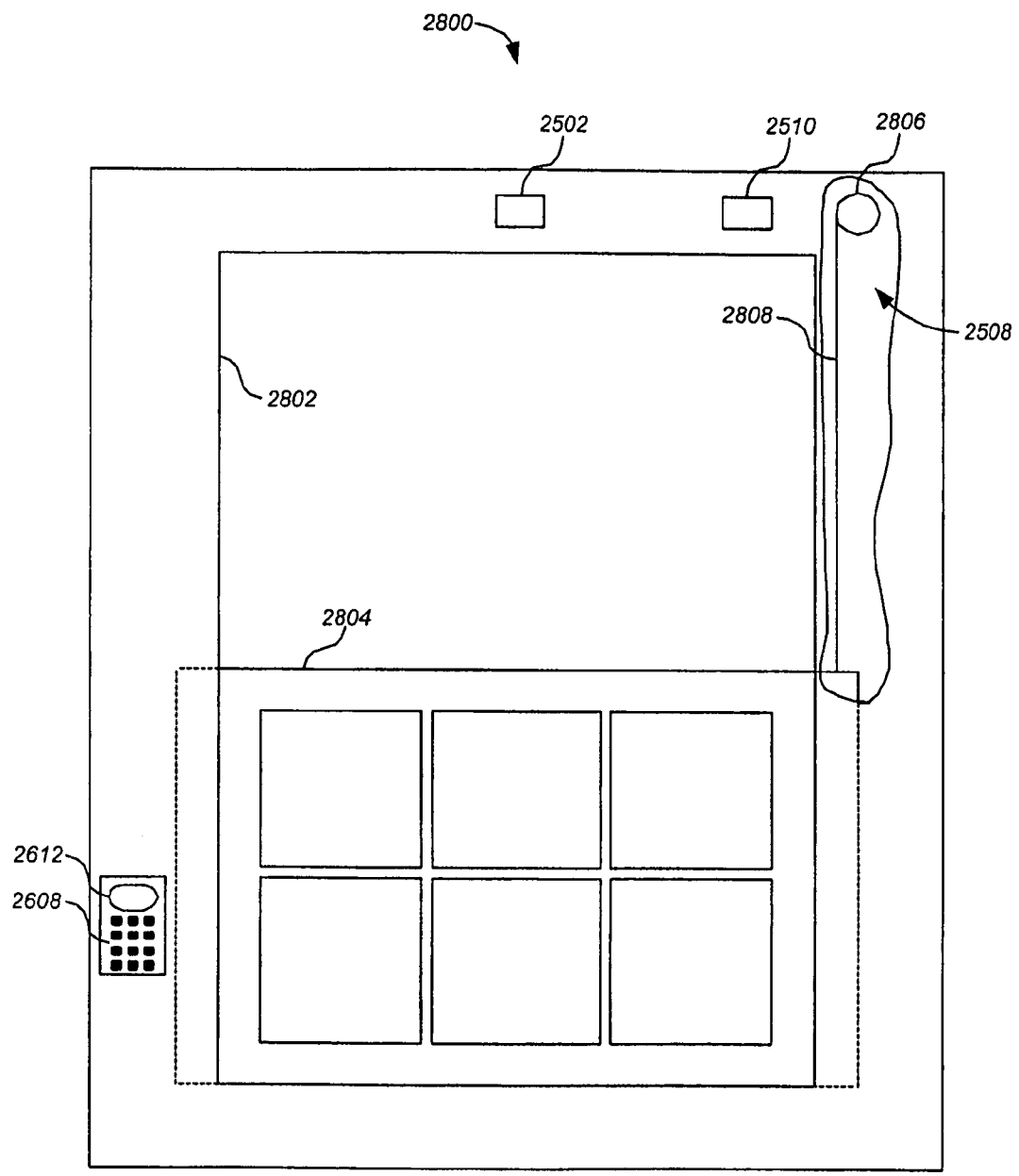
FIG. 28 shows a window according to one embodiment.

FIG. 28 shows a window 2800 according to one embodiment. While features of the invention are described with respect to window 2800 and an actuator for opening and closing window 2800, other sorts of physical portals and actuators are contemplated. In addition, features of the invention can be located in different parts of the window, door, or the like, such as in the sash, windowpane, door panel, frame, and so on. Window 2800 comprises a frame 2802 and a sash 2804 that can be moved in a vertical plane to open and close window 2800. Window 2800 also comprises a controller 2510 and an actuator 2508, installed inside window frame 2802 and shown in a cutaway view of window frame 2802, that is to raise and lower sash 2804 according to a control signal provided by controller 2510. In this example, actuator 2508 comprises a motor 2806 and a sash cable 2808 connected between motor 2806 and sash 2804. Of course window 2800 can include other actuators for other purposes, for example to lock window 2800, or to obscure window 2800 by operating blinds, liquid-crystal display windowpanes, and the like, that are within or external to window 2800.

Window 2800 optionally comprises one or more sensors 2502 that provide a sensor signal. Sensors 2502 can comprise a thermometer, a light detector, a moisture detector, a wind detector, a barometer, a motion detector, a smoke detector, a gas detector, a glass breakage detector, or other sorts of sensors. As described above, controller 2510 optionally comprises a keypad 2608 and display 2612.

Figure 29:
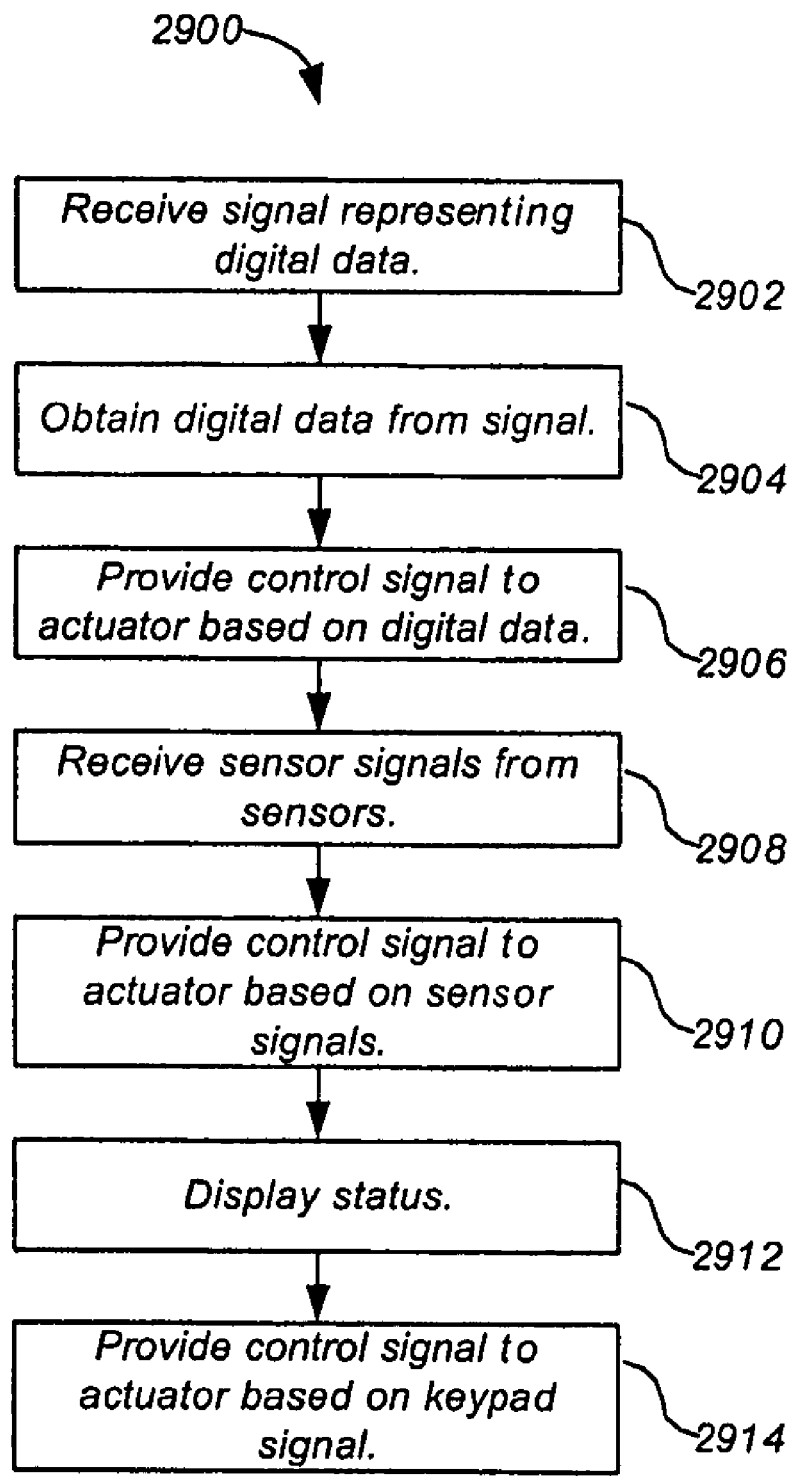
FIG. 29 shows a process that can be performed by the window of FIG. 28 according to one embodiment.

FIG. 29 shows a process 2900 that can be performed by window 2800 according to one embodiment. Controller 2510 receives a signal representing digital data (2902), and obtains the digital data from the signal (step 2904). The digital data can represent an instruction to manipulate window 2800, or information that can be used by controller 2510 to determine when and how to manipulate window 2800. For example, the digital data can represent a schedule for the operation of window 2800. As another example, the digital data can represent current or predicted weather conditions that controller 2510 can use to determine when and how to operate window 2800. For this example, assume the digital data represents a forecast of inclement weather, and therefore controller 2510 has determined to close window 2800 immediately.

Controller 2510 produces a "close window" control signal, and provides the control signal to actuator 2508 (step 2906), causing actuator 2508 to close window 2800. Subsequently, controller 2510 receives sensor signals from sensors 2502 (step 2908) within and/or external to window 2800 that indicate rising temperature, increasing sunlight, falling relative humidity, and rising barometric pressure. Accordingly, controller determines window 2800 should be opened, and provides an "open window" control signal to actuator 2508 (step 2910), causing actuator 2508 to open window 2800.

Subsequently a user observes the status of window 2800 on display 2612 (step 2912), and enters a "close window" command using keypad 2608. In response, controller 2510 produces a "close window" control signal, and provides the control signal to actuator 2508 (step 2914), causing actuator 2508 to close window 2800.

In other embodiments, the user can control window 2800 remotely. Controller 2510 can transmit a report signal representing the status of window 2800. The user receives the report signal, for example as an email message or HTML document on a personal computer. The user enters a window command that is received as a signal by controller 2510, which provides a corresponding control signal to actuator 2508.

If the signal representing the digital data is unavailable, controller 2510 can operate window 2800 according to information provided by sensor 2502 and/or a stored actuator schedule of operation.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An alarm monitor comprising:
memory that stores an actuator schedule;
an input circuit that receives a sensor signal that indicates an alarm condition, the sensor signal originating from a sensor that is remote from the alarm monitor;
a processor that generates digital data based on said sensor signal and that generates a first control signal to control an actuator based on said actuator schedule; and
an interface that wirelessly transmits a report signal to a remote master unit based on said digital data and that transmits said first control signal to said actuator.

2. The alarm monitor of claim 1 wherein said processor actuates a part of at least one of a window and a door via said actuator.

3. The alarm monitor of claim 2 wherein said part includes one of blinds, windowpanes, a sash, a sash cable, and a door panel.

4. The alarm monitor of claim 1 wherein said processor wirelessly transmits said first control signal to said actuator via said interface.

5. The alarm monitor of claim 1 wherein said processor at least one of opens, closes and obscures a physical portal based on said report signal via said actuator.

6. The alarm monitor of claim 1 wherein said processor signals said interface to transmit said report signal when said sensor signal is equal to a predetermined value.

7. The alarm monitor of claim 1 further comprising a receiver that receives a sensor calibration signal from said remote master unit,
wherein said processor calibrates an alarm sensor based on said sensor calibration signal.

8. The alarm monitor of claim 1 further comprising a media access controller that generates said report signal based on said digital data.

9. The alarm monitor of claim 8 wherein said media access controller generates an electronic mail (email) message comprising said digital data, and
wherein said interface transmits said email message to at least one of a personal computer and a portable device.

10. The alarm monitor of claim 8 further comprising a receiver that receives another signal comprising a destination address,
wherein said media access controller directs said email message to said destination address.

11. The alarm monitor of claim 1 wherein said processor is in a sleep mode when said sensor signal is equal to a predetermined value for a predetermined interval, and
wherein said processor transitions to an active mode and transmits said report signal via said interface when said sensor signal is no longer equal to said predetermined value.

12. The alarm monitor of claim 1 wherein said processor actuates a device that is connected to a physical portal based on said actuator schedule and independent of said digital data.

13. An alarm system comprising the alarm monitor of claim 2 and further comprising an alarm sensor that generates an alarm signal,
wherein said processor generates said digital data based on said alarm signal.

14. The alarm system of claim 13 wherein said alarm sensor comprises a camera, and
wherein said alarm signal comprises an image captured by said camera.

15. The alarm system of claim 13 wherein said alarm sensor comprises at least one of a seismometer, a barometer, a thermometer, a motion detector, a smoke detector, a carbon monoxide detector, and a glass breakage detector.

16. An alarm system comprising the alarm monitor and said remote master unit of claim 1,
wherein said remote master unit generates a second control signal to control said actuator based on said report signal.

17. The alarm system of claim 16 wherein said remote master unit includes a network appliance.

18. The alarm system of claim 16 comprising a plurality of said alarm monitors that are in communication with said remote master unit.

19. The alarm system of claim 16 further comprising an intruder sensor that generates said sensor signal.

20. The alarm system of claim 16 further comprising a weather sensor that generates said sensor signal.

21. The alarm system of claim 16 further comprising:
a receiver that receives a sensor calibration signal,
wherein said processor calibrates said sensor based on said sensor calibration signal.

22. A controller comprising:
an input circuit that receives a sensor signal that indicates an alarm condition, the sensor signal originating from an alarm sensor that is remote from the controller and that receives a sensor calibration signal that is associated with said alarm sensor from a remote master unit;
a processor that generates digital data based on said sensor signal; and
a transmitter that wirelessly transmits a report signal to said remote master unit based on said digital data,
wherein said processor remotely calibrates said alarm sensor via said transmitter based on said sensor calibration signal.

23. The controller of claim 22 further comprising a media access controller that generates said report signal based on said digital data.

24. The controller of claim 23 wherein said media access controller generates an electronic mail (email) message comprising said digital data, and
wherein said transmitter transmits said email message to at least one of a personal computer and a portable device.

25. The controller of claim 24 wherein said receiver receives another signal comprising a destination address, and
wherein said media access controller directs said email message to said destination address.

26. The controller of claim 22 wherein said processor transmits said report signal when said sensor signal is equal to a predetermined value.

27. The controller of claim 22 wherein said processor is in a sleep mode when said sensor signal is equal to a predetermined value for a predetermined interval, and
wherein said processor is in an active mode and transmits said report signal via said transmitter when said sensor signal is no longer equal to said predetermined value.

28. The controller of claim 22 wherein said alarm sensor includes at least one of a camera, a seismometer, a barometer, a thermometer, a motion detector, a smoke detector, a carbon monoxide detector, and a glass breakage detector.

29. The controller of claim 22 wherein said processor actuates a part of at least one of a window and a door via said actuator.

30. The controller of claim 29 wherein said part includes one of blinds, windowpanes, a sash, a sash cable, and a door panel.

31. The controller of claim 22 wherein said processor wirelessly transmits said first control signal to an actuator.

32. The controller of claim 22 wherein said processor at least one of opens, closes and obscures a physical portal based on said report signal.

33. The controller of claim 32 further comprising an output circuit that generates a second control signal based on said first control signal to at least one of open, close and obscure said physical portal.

34. The controller of claim 22 wherein said processor is in a sleep mode when said sensor signal is equal to a predetermined value for a predetermined interval, and
wherein said processor transitions to an active mode and transmits said report signal via said transmitter when said sensor signal is no longer equal to said predetermined value.

35. The alarm system of claim 22 wherein said processor actuates a device that is connected to a physical portal based on an actuator schedule and independent of said digital data.

36. A monitor comprising:
an input circuit that receives a sensor signal originated from a remote sensor selected from at least one of a sunlight detector, a seismometer, a barometer, a wind detector and a moisture detector;
a processor that generates digital data based on said sensor signal and that generates a first control signal to control an mechanical actuator based on said digital data; and
an interface that wirelessly transmits a report signal to a remote master unit based on said digital data and that transmits said first control signal to said actuator.

37. The monitor of claim 36 wherein said processor actuates a part of at least one of a window and a door via said actuator.

38. The monitor of claim 37 wherein said part includes one of blinds, windowpanes, a sash, a sash cable, and a door panel.

39. The monitor of claim 36 wherein said processor wirelessly transmits said first control signal to said actuator via said interface.

40. The monitor of claim 36 wherein said processor at least one of opens, closes and obscures a physical portal based on said control signal via said actuator.

41. The monitor of claim 36 wherein said processor signals said interface to transmit said report signal when said sensor signal is equal to a predetermined value.

42. The monitor of claim 36 further comprising a receiver that receives a sensor calibration signal from said remote master unit,
wherein said processor calibrates said remote sensor based on said sensor calibration signal.

43. The monitor of claim 36 further comprising a media access controller that generates said report signal based on said digital data.

44. The monitor of claim 43 wherein said media access controller generates an electronic mail (email) message comprising said digital data, and
wherein said interface transmits said email message to at least one of a personal computer and a portable device.

45. The monitor of claim 43 further comprising a receiver that receives another signal comprising a destination address,
wherein said media access controller directs said email message to said destination address.

46. The monitor of claim 36 wherein said processor is in a sleep mode when said sensor signal is equal to a predetermined value for a predetermined interval, and
wherein said processor transitions to an active mode and transmits said report signal via said interface when said sensor signal is no longer equal to said predetermined value.

47. The monitor of claim 36 wherein said processor actuates a device that is connected to a physical portal based on an actuator schedule and independent of said digital data.

48. A system comprising the controller of claim 36 and further comprising an alarm sensor that generates an alarm signal,
wherein said processor generates said digital data based on said alarm signal.

49. The system of claim 48 wherein said alarm sensor comprises a camera, and
wherein said alarm signal comprises an image captured by said camera.

50. A system comprising the monitor and said remote master unit of claim 36,
wherein said remote master unit generates a second control signal to control said actuator based on said report signal.

51. The system of claim 50 wherein said remote master unit includes a network appliance.

52. The system of claim 50 comprising a plurality of said monitors that are in communication with said remote master unit.

53. The monitor of claim 36 further comprising:
a receiver that receives a sensor calibration signal,
wherein said processor calibrates said remote sensor based on said sensor calibration signal.

* * * * *

UNITED STATES PATENT AND TRADEMARK OFFICE
CERTIFICATE OF CORRECTION

PATENT NO. : 7,522,039 B2  
APPLICATION NO. : 11/981729  
DATED : April 21, 2009  
INVENTOR(S) : Sehat Sutardja et al.

Page 1 of 1

It is certified that error appears in the above-identified patent and that said Letters Patent is hereby corrected as shown below:

| | |
|---|---|
| Column 1, Line 51 | Insert -- be -- after "can" |
| Column 1, Line 64 | Insert -- with -- after "accordance" |
| Column 9, Line 30 | Delete "described" and insert -- describe -- |
| Column 9, Line 54-55 | Delete "the amount data stored" after "stored" |
| Column 9, Line 60 | Insert -- written -- after "being" |
| Column 10, Line 58 | Insert -- to -- after "utilized" |
| Column 11, Line 41 | Delete "replaces" and insert -- replaced -- |
| Column 12, Line 37 | Delete "AThe" and insert -- The -- |
| Column 21, Line 46 | Delete "alarm system" and insert -- controller -- |

Signed and Sealed this

Sixth Day of October, 2009

David J. Kappos  
*Director of the United States Patent and Trademark Office*

UNITED STATES PATENT AND TRADEMARK OFFICE
CERTIFICATE OF CORRECTION

PATENT NO.         : 7,522,039 B2  
APPLICATION NO. : 11/981729  
DATED                 : April 21, 2009  
INVENTOR(S)       : Sutardja et al.

Page 1 of 1

It is certified that error appears in the above-identified patent and that said Letters Patent is hereby corrected as shown below:

On the title page please delete Item "(73)" and insert Item --(73) Marvell International, Ltd.,--

Signed and Sealed this

Twenty-seventh Day of October, 2009

David J. Kappos
*Director of the United States Patent and Trademark Office*